(12) United States Patent
Li et al.

(10) Patent No.: US 12,232,208 B2
(45) Date of Patent: Feb. 18, 2025

(54) COMMUNICATION METHOD, SLRB ESTABLISHMENT METHOD, AND COMMUNICATIONS APPARATUS

(71) Applicant: Huawei Technologies Co., Ltd., Shenzhen (CN)

(72) Inventors: Xiangyu Li, Shanghai (CN); Wenjie Peng, Shanghai (CN); Jun Wang, Shanghai (CN); Xiao Xiao, Shenzhen (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 17/590,656

(22) Filed: Feb. 1, 2022

(65) Prior Publication Data
US 2022/0159776 A1    May 19, 2022

Related U.S. Application Data

(63) Continuation of application No. PCT/CN2019/115168, filed on Nov. 1, 2019.

(30) Foreign Application Priority Data

Aug. 7, 2019 (CN) .......................... 201910727621.2

(51) Int. Cl.
| H04W 76/00 | (2018.01) |
| H04W 76/30 | (2018.01) |
| H04W 4/40 | (2018.01) |
| H04W 92/18 | (2009.01) |

(52) U.S. Cl.
CPC .............. *H04W 76/30* (2018.02); *H04W 4/40* (2018.02); *H04W 92/18* (2013.01)

(58) Field of Classification Search
CPC ........ H04W 76/30; H04W 4/40; H04W 92/18
See application file for complete search history.

(56) References Cited

U.S. PATENT DOCUMENTS

| 10,524,232 B2 | 12/2019 | Lee et al. |
| 10,873,989 B1* | 12/2020 | Pan ...................... H04W 76/14 |
| 11,381,994 B2 | 7/2022 | Chang et al. |
| 2019/0053288 A1 | 2/2019 | Zhou et al. |

(Continued)

FOREIGN PATENT DOCUMENTS

| CN | 102355692 A | 2/2012 |
| CN | 103200599 A | 7/2013 |

(Continued)

OTHER PUBLICATIONS

Samsung, "SL RBs/LCHs and SL RB Configurations for NR Sidelink", 3GPP TSG-RAN2 106, R2-1905728, May 13-17, 2019, 6 pages, Reno, USA.

(Continued)

*Primary Examiner* — Erika A Washington
(74) *Attorney, Agent, or Firm* — Slater Matsil, LLP

(57) ABSTRACT

Embodiments of this application provides a communication method for releasing a sidelink radio bearer (SLRB), this method can be implemented by a terminal device, the method including: the terminal device obtains an indication, the indication indicates that no Quality of Service (QoS) flow with data that is mapped to a first SLRB; and the terminal device releases the first SLRB.

14 Claims, 5 Drawing Sheets

600

A first terminal device determines whether one or more of the following is met: a first QoS flow has data; the first terminal device is configured by an upper layer to perform sidelink communication; the first terminal device receives first configuration information sent by a network device, where the first configuration information indicates that a first QoS flow is mapped to a first SLRB, and the first SLRB has been established; the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has been established — S610

When one or more of the foregoing is met, the first terminal device reconfigures the first SLRB — S620

(56) References Cited

U.S. PATENT DOCUMENTS

2019/0215896 A1 7/2019 Zhou et al.
2021/0410129 A1* 12/2021 Freda .................. H04W 72/543

FOREIGN PATENT DOCUMENTS

| | | |
|---|---|---|
| CN | 108924866 A | 11/2018 |
| CN | 109412771 A | 3/2019 |
| CN | 109661833 A | 4/2019 |
| JP | 2020125393 A | 8/2020 |
| JP | 2021027585 A | 2/2021 |
| KR | 20180112842 A | 10/2018 |
| WO | 2018171380 A1 | 9/2018 |
| WO | 2018228326 A1 | 12/2018 |
| WO | 2019061180 A1 | 4/2019 |
| WO | 2019138284 A1 | 7/2019 |

OTHER PUBLICATIONS

3GPP TS 37.324 V15.1.0 (Sep. 2018), 3rd Generation Partnership Project; Technical Specification Group Radio Access Network; E-UTRA and NR; Service Data Adaptation Protocol (SDAP) specification(Release 15), 13 pages.
3GPP TS 22.186 V16.2.0 (Jun. 2019), 3rd Generation Partnership Project; Technical Specification Group Services and System Aspects; Enhancement of 3GPP support for V2X scenarios; Stage 1(Release 16), 18 pages.
Huawei, HiSilicon, "Details about NR SL QoS handling", 3GPP TSG-RAN WG2 Meeting #106, R2-1907454, May 13-17, 2019, 9 pages, Reno, USA.
ETSI TS 138 300 V15.6.0, 3GPP TS 38.300 V15.6.0 (Jun. 2019), 3rd Generation Partnership Project; Technical Specification Group Radio Access Network; NR; NR and NG-RAN Overall Description; Stage 2 (Release 15), 102 pages.
3GPP TR 22.886 V16.2.0 (Dec. 2018)3rd Generation Partnership Project; Technical Specification Group Services and System Aspects; Study on enhancement of 3GPP Support for 5G V2X Services(Release 16), 76 pages.
LG Electronics, "NR PC5 QoS modelling and operations in EPC", SA WG2 Meeting #134, S2-1907580, Jun. 24-28, 2019, 5 pages, Sapporo, Japan.
3GPP TS 23.287 V1.1.0 (Jul. 2019); 3rd Generation Partnership Project; Technical Specification Group Services and System Aspects; Architecture enhancements for 5G System (5GS) to support Vehicle-to-Everything (V2X) services (Release 16); 50 pages.
3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
CATT, "SDAP Open Issues", 3GPP TSG-RAN WG2 Meeting #105bis, R2-1903175, Apr. 8-12, 2019, 3 pages, Ki'an, China.
LG Electronics, "TS 23.287 PC5 unicast link related information to AS layer", SA WG2 Meeting #133, S2-1906301, May 13-17, 2019, 6 pages, Reno, Nevada, USA.
"Remaining Issues on PC5-RRC Message Exchange," Source: vivo, Agenda Item: 11.4.5, Document for: Discussion and Decision, 3GPP TSG-RAN WG2 Meeting #106, R2-1905843, May 13-17, 2019, 4 pages.
"TS 23.287 NR PC5 QoS," Source: LG Electronics, Document for: Approval, Agenda Item: 6.6, Work Item/Release: eV2XARC/Rel-16, SA SG2 Temporary Document, SA WG2 Meeting # 133, S2-1905480 (revision of S2-19xxxxx), May 13-17, 2019, 16 pages.
Email Discussion Rapporteur (ZTE), "Procedures and mgsB content [105bis#30][NR/2-step RACH]", 3GPP TSG-WG2 Meeting #106, R2-1906308, Reno, NV, US, May 13-17, 2019, 91 pages.
NTT Docomo, Inc., "Study on New Radio Access Technology", 3GPP TSG RAN meeting #75, RP-170376, Dubrovnik, Croatia, Mar. 6-9, 2017, 157 pages.
Session Chair (InterDigital), "Report from LTE and NR User Plane Break-Out Session", 3GPP TSG-RAN WG2 Meeting #101, R2-1803735, Athens, Greece, Feb. 28-Mar. 2, 2018, 81 pages.
Ericsson, R2-1907363, Criteria to establish and release SL QoS flow and radio bearer, 3GPP TSG-Ran WG2 #106, May 13-17, 2019, total 4 pages.
Huawei et al., R2-1907452, Relationship between PC5-RRC connection and PC5-S connection, 3GPP TSG-RAN2 Meeting #106, May 13-17, 2019, total 5 pages.
Ericsson, TDoc R2-1904708, Criteria to establish and release a radio bearer, 3GPP TSG-RAN WG2 #105bis, Apr. 8-12, 2019, total 4 pages.

* cited by examiner

100

200

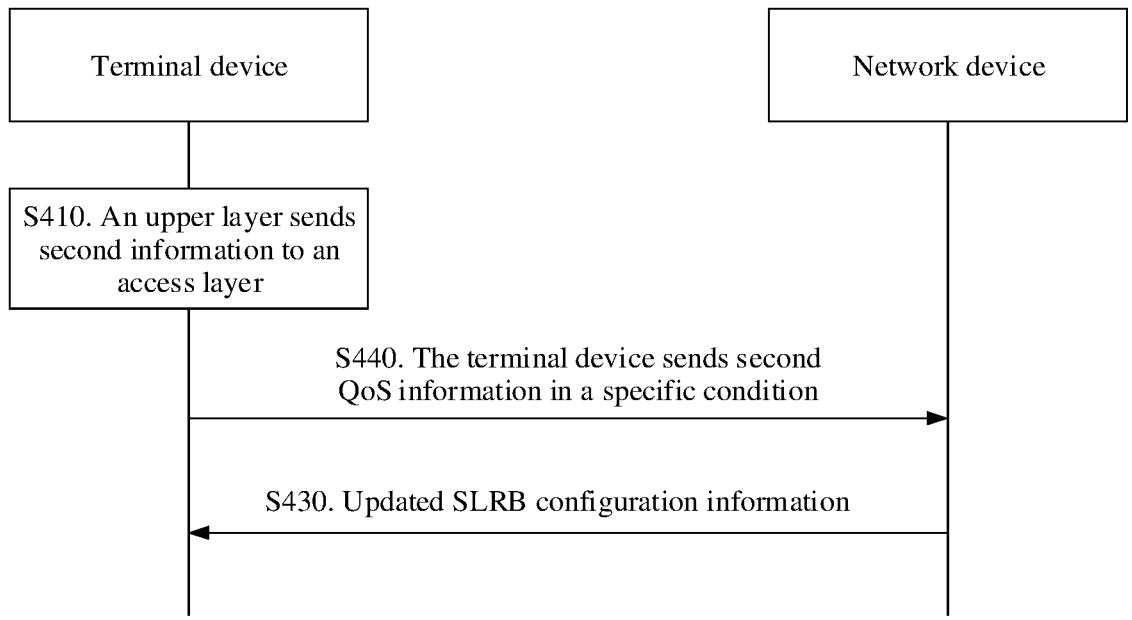

A first terminal device determines whether one or more of the following is met: a first QoS flow has data; the first terminal device is configured by an upper layer to perform sidelink communication; the first terminal device receives first configuration information sent by a network device, where the first configuration information indicates that a first QoS flow is mapped to a first SLRB, and the first SLRB has not been established; the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has not been established ⎯ S510

When one or more of the foregoing is met, the first terminal device establishes the first SLRB ⎯ S520

A first terminal device determines whether one or more of the following is met: a first QoS flow has data; the first terminal device is configured by an upper layer to perform sidelink communication; the first terminal device receives first configuration information sent by a network device, where the first configuration information indicates that a first QoS flow is mapped to a first SLRB, and the first SLRB has been established; the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has been established — S610

When one or more of the foregoing is met, the first terminal device reconfigures the first SLRB — S620

FIG. 6

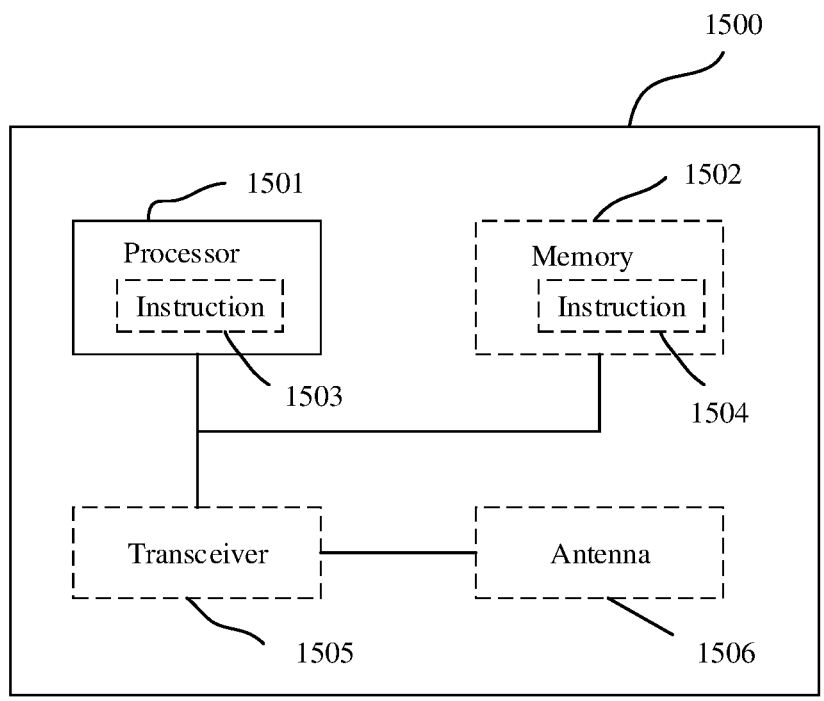

FIG. 7

COMMUNICATION METHOD, SLRB ESTABLISHMENT METHOD, AND COMMUNICATIONS APPARATUS

CROSS-REFERENCE TO RELATED APPLICATIONS

This application is a continuation of International Application No. PCT/CN2019/115168, filed on Nov. 1, 2019, which claims priority to Chinese Patent Application No. 201910727621.2, filed on Aug. 7, 2019. The disclosures of the aforementioned applications are herein incorporated by reference in their entireties.

TECHNICAL FIELD

This application relates to the communications field, and more specifically, to a communication method, an SLRB establishment method, and a communications apparatus.

BACKGROUND

In an internet of vehicles (vehicle to everything, V2X) scenario, when transmitting data through a sidelink (SL), a terminal device needs to know sidelink radio bearer (SLRB) configuration information to which a quality of service (QoS) flow from a V2X layer needs to be mapped. However, a case in which the SLRB configuration information, to which the QoS flow needs to be mapped, needs to be obtained is not clearly defined in the prior art.

SUMMARY

This application provides a communication method and a communications apparatus, to clearly define a condition for triggering reporting of QoS information, so that a terminal device can determine when to report the QoS information.

According to a first aspect, a communication method is provided, including: An access layer (AS) of a terminal device receives first information sent by an upper layer of the terminal device, where the first information is used to identify a first quality of service QoS flow. When the access layer determines that the first QoS flow is a new QoS flow for which sidelink communication needs to be performed, or when the access layer determines that the first QoS flow is a new QoS flow for which sidelink communication needs to be performed and no mapping relationship from the first QoS flow to a sidelink radio bearer SLRB is configured, or when the access layer determines that no mapping relationship from the first QoS flow to a sidelink radio bearer SLRB is configured, the terminal device reports first QoS information to a network device, where the first QoS information includes some or all content in the first information, and the first QoS information is used to request SLRB configuration information associated with the first QoS flow.

Optionally, the method may further include: The terminal device receives the SLRB configuration information that is associated with the first QoS flow and that is sent by the network device.

For example, the upper layer may be a V2X layer, an application layer, or a layer between a V2X layer and an application layer. For example, the access layer may include a radio resource control (RRC) layer, a service data adaptation protocol (SDAP) layer, a packet data convergence protocol (PDCP) layer, a radio link control (RLC) layer, and a media access control (MAC) layer. Optionally, the access layer may further include a physical (PHY) layer.

Optionally, the SLRB in this application is a sidelink data radio bearer (SL-DRB).

Optionally, the access layer may send the first information before sending the first QoS flow, or may send the first information when sending the first QoS flow, that is, when sending a data packet corresponding to the first QoS flow.

It should be understood that a mapping relationship from the first QoS flow to the SLRB may be a mapping relationship from the first information to the SLRB, or may be a mapping relationship from some parameters associated with or related to the first QoS flow to the SLRB. For example, the mapping relationship from the first QoS flow to the SLRB may be a mapping relationship from a first QoS parameter to the SLRB, or a mapping relationship from both a first PFI and first communication type information to the SLRB, or a mapping relationship from all of a first PFI, a first source identifier, a first destination identifier, and first communication type information to the SLRB.

According to the method provided in this application, a condition for triggering the terminal device to report QoS information is clearly defined, so that the terminal device may report QoS information only when a specific condition is met, thereby avoiding reporting corresponding QoS information for each QoS flow or each data packet, and reducing signaling overheads.

Optionally, the first information includes one or more of first sidelink information, the first PC5 interface quality of service flow identifier (PC5 QoS flow identifier, PFI), and the first QoS parameter, and the first sidelink information is associated with the first PFI and the first QoS parameter.

For example, the first information includes the first PFI and the first QoS parameter.

The first sidelink information is used to identify a first sidelink, and the first sidelink information includes one or more of the first communication type information, the first source identifier, and the first destination identifier. For example, the first sidelink information includes the first destination identifier; or the first sidelink information includes the first source identifier and the first destination identifier; or the first sidelink information includes the first communication type information and the first destination identifier; or the first sidelink information includes the first communication type information, the first source identifier, and the first destination identifier.

The first communication type information is one of unicast, multicast, and broadcast; or the first communication type information is one of two of the following three communication types: unicast, multicast, and broadcast.

For example, the first QoS parameter may include one or more of the following parameters: a first PC5 interface fifth-generation communications system quality of service identifier (PC5 5G quality of service identifier, PQI), a guaranteed flow bit rate (GFBR), a maximum flow bit rate (MFBR), and a minimum required communication range (range).

With reference to the first aspect, in some implementations of the first aspect, that the access layer determines that the first QoS flow is a new QoS flow for which sidelink communication needs to be performed includes: If the access layer determines that a stored PFI associated with the first sidelink information does not include the first PFI, and/or a stored QoS parameter associated with the first sidelink information does not include the first QoS parameter, the access layer determines that the first QoS flow is the new QoS flow for which sidelink communication needs to be performed.

With reference to the first aspect, in some implementations of the first aspect, that the access layer determines that the first QoS flow is a new QoS flow for which sidelink communication needs to be performed includes: If the access layer determines that a stored PFI does not include the first PFI, and/or a stored QoS parameter does not include the first QoS parameter, the access layer determines that the first QoS flow is the new QoS flow for which sidelink communication needs to be performed.

According to the foregoing two solutions, whether the first QoS flow is the new QoS flow can be determined.

With reference to the first aspect, in some implementations of the first aspect, the first QoS information includes the first QoS parameter and the first communication type information.

With reference to the first aspect, in some implementations of the first aspect, the SLRB configuration information associated with the first QoS flow includes first SDAP entity configuration information, the first SDAP entity configuration information includes the first QoS parameter, and the first SDAP entity configuration information is associated with the first communication type information.

With reference to the first aspect, in some implementations of the first aspect, the first QoS information includes the first PFI, the first QoS parameter, and the first sidelink information.

With reference to the first aspect, in some implementations of the first aspect, the SLRB configuration information associated with the first QoS flow includes first SDAP entity configuration information. When the first sidelink information includes the first communication type information, the first SDAP entity configuration information includes the first PFI, and includes content other than the first communication type information in the first sidelink information, and the first SDAP entity configuration information is associated with the first communication type information. When the first sidelink information does not include the first communication type information, the first SDAP entity configuration information includes the first PFI and the first sidelink information.

With reference to the first aspect, in some implementations of the first aspect, the SLRB configuration information associated with the first QoS flow may further include one or more of the following: PDCP entity configuration information, RLC entity configuration information, and logical channel (LCH) configuration information.

According to a second aspect, a communication method is provided, including: A network device receives first quality of service QoS information reported by a terminal device, where the first QoS information is used to request a mapping relationship from a first quality of service QoS flow to a sidelink radio bearer SLRB. The network device sends, to the terminal device, SLRB configuration information associated with the first QoS flow.

According to the method provided in this application, the network device may send, to the terminal device based on QoS information reported by the terminal device, SLRB configuration information to which a QoS flow related to the QoS information is mapped.

With reference to the second aspect, in some implementations of the second aspect, the first QoS flow is identified by first information, the first QoS information includes some or all content in the first information, and the first information includes one or more of first sidelink information, a first PC5 interface quality of service flow identifier PFI, and a first QoS parameter. The first sidelink information is associated with the first PFI and the first QoS parameter. The first sidelink information is used to identify a first sidelink. The first sidelink information includes one or more of first communication type information, a first source identifier, and a first destination identifier. The first communication type information is one of unicast, multicast, and broadcast.

With reference to the second aspect, in some implementations of the second aspect, the first QoS information includes the first QoS parameter and the first communication type information.

With reference to the second aspect, in some implementations of the second aspect, the SLRB configuration information associated with the first QoS flow includes first service data adaptation protocol SDAP entity configuration information, the first SDAP entity configuration information includes the first QoS parameter, and the first SDAP entity configuration information is associated with the first communication type information.

With reference to the second aspect, in some implementations of the second aspect, the first QoS information includes the first PFI, the first QoS parameter, and the first sidelink information.

With reference to the second aspect, in some implementations of the second aspect, the SLRB configuration information associated with the first QoS flow includes first service data adaptation protocol SDAP entity configuration information. When the first sidelink information includes the first communication type information, the first SDAP entity configuration information includes the first PFI, and includes content other than the first communication type information in the first sidelink information, and the first SDAP entity configuration information is associated with the first communication type information. When the first sidelink information does not include the first communication type information, the first SDAP entity configuration information includes the first PFI and the first sidelink information.

For phrases or terms that appear in the second aspect and that are the same as those in the first aspect, refer to the descriptions in the first aspect. Details are not described herein again.

For phrases or terms that appear in the following aspects and that are the same as those in the first aspect, refer to the descriptions in the first aspect. Details are not described below again.

In a current technology, when to establish an SLRB is not clearly defined, and therefore a terminal device cannot establish an SLRB on a proper occasion, thereby affecting sidelink transmission.

In view of this, this application provides an SLRB establishment method, to clearly define a condition for triggering a terminal device to establish an SLRB, so that the terminal device may establish the SLRB when the condition is met, to perform sidelink transmission.

According to a third aspect, a sidelink radio bearer SLRB establishment method is provided, including:

When one or more of the following is met, a first terminal device establishes a first SLRB to which a first quality of service (QoS) flow needs to be mapped:
- the first QoS flow has data;
- the first terminal device is configured by an upper layer of the first terminal device to perform sidelink communication;
- the first terminal device receives first configuration information sent by a network device, where the first configuration information indicates that the first QoS flow is mapped to the first SLRB, and the first SLRB has not been established;

the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has not been established, where when the first SLRB is associated with a unicast connection, the second terminal device is a peer terminal device of the first terminal device in the unicast connection.

It should be understood that the first SLRB may be established when one or any combination of the foregoing five conditions is met.

Optionally, the first SLRB is not a default SLRB.

Optionally, the first SLRB is associated with first sidelink information, the first sidelink information is used to identify a first sidelink, the first sidelink information includes one or more of first communication type information, a first source identifier, and a first destination identifier, and the first communication type information is one of unicast, multicast, and broadcast.

According to the SLRB establishment method provided in this application, a condition for triggering a terminal device to establish an SLRB is clearly defined, so that the terminal device may establish the SLRB when the condition is met, to perform sidelink transmission.

With reference to the third aspect, in some implementations of the third aspect, that the first QoS flow has data includes: The upper layer of the first terminal device initiates the first QoS flow, or the second terminal device initiates the first QoS flow.

Optionally, that the upper layer of the first terminal device initiates the first QoS flow includes: The upper layer indicates, to an access layer of the first terminal device, a first PC5 interface quality of service flow identifier PFI and a first QoS parameter that are associated with the first QoS flow; or the upper layer delivers, to the access layer, a data packet corresponding to the first QoS flow.

Optionally, that the second terminal device initiates the first QoS flow includes: The second terminal device sends, to the first terminal device, a first PC5 interface quality of service flow identifier PFI and a first QoS parameter that are associated with the first QoS flow.

With reference to the third aspect, in some implementations of the third aspect, the second configuration information is an RRC reconfiguration message. For example, the RRC reconfiguration message is a PC5-RRC reconfiguration message.

With reference to the third aspect, in some implementations of the third aspect, the second configuration information is sent by the second terminal device when the second terminal device needs to establish a second SLRB associated with the first SLRB.

In a current technology, when to reconfigure (that is, perform reconfiguration on) an SLRB is not clearly defined, and therefore a terminal device cannot reconfigure an SLRB on a proper occasion, thereby affecting sidelink transmission.

In view of this, this application provides an SLRB reconfiguration method, to clearly define a condition for triggering a terminal device to reconfigure an SLRB, so that the terminal device may reconfigure the SLRB when the condition is met, to perform sidelink transmission.

According to a fourth aspect, a sidelink radio bearer SLRB reconfiguration method is provided, including: When one or more of the following is met, a first terminal device reconfigures a first SLRB to which a first quality of service (QoS) flow needs to be mapped:

the first QoS flow has data;

the first terminal device is configured by an upper layer of the first terminal device to perform sidelink communication;

the first terminal device receives first configuration information sent by a network device, where the first configuration information indicates that the first QoS flow is mapped to the first SLRB, and the first SLRB has been established;

the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has been established, where when the first SLRB is associated with a unicast connection, the second terminal device is a peer terminal device of the first terminal device in the unicast connection.

Optionally, the first SLRB is associated with first sidelink information, the first sidelink information is used to identify a first sidelink, the first sidelink information includes one or more of first communication type information, a first source identifier, and a first destination identifier, and the first communication type information is one of unicast, multicast, and broadcast.

Optionally, the first SLRB is not a default SLRB.

According to the SLRB reconfiguration method provided in this application, a condition for triggering a terminal device to reconfigure an SLRB is clearly defined, so that the terminal device may reconfigure the SLRB when the condition is met, to perform sidelink transmission.

With reference to the fourth aspect, in some implementations of the fourth aspect, that the first QoS flow has data includes: The upper layer of the first terminal device initiates the first QoS flow, or the second terminal device initiates the first QoS flow.

Optionally, that the upper layer of the first terminal device initiates the first QoS flow includes: The upper layer indicates, to an access layer of the first terminal device, a first PC5 interface quality of service flow identifier PFI and a first QoS parameter that are associated with the first QoS flow; or the upper layer delivers, to the access layer, a data packet corresponding to the first QoS flow.

Optionally, that the second terminal device initiates the first QoS flow includes: The second terminal device sends, to the first terminal device, a first PC5 interface quality of service flow identifier PFI and a first QoS parameter that are associated with the first QoS flow.

With reference to the fourth aspect, in some implementations of the fourth aspect, the second configuration information is an RRC reconfiguration message. For example, the RRC reconfiguration message is a PC5-RRC reconfiguration message.

With reference to the fourth aspect, in some implementations of the fourth aspect, the second configuration information is sent by the second terminal device when the second terminal device needs to re-establish a second SLRB associated with the first SLRB.

According to a fifth aspect, a sidelink radio bearer SLRB release method is provided, including: When one or more of the following is met, a first terminal device releases a first SLRB:

the first terminal device is configured by an upper layer to perform sidelink communication;

the first terminal device receives first SLRB release information sent by a network device;

no QoS flow with data is mapped to the first SLRB;

the first terminal device receives a reconfiguration complete message sent by a second terminal device;

the first terminal device receives first SLRB release information sent by the second terminal device; and the first SLRB has no data to be sent or received, where when the first SLRB is associated with a unicast connection, the second terminal device is a peer terminal device of the first terminal device in the unicast connection.

Optionally, a first sidelink information is used to identify a first sidelink, the first sidelink information includes one or more of first communication type information, a first source identifier, and a first destination identifier, and the first communication type information is one of unicast, multicast, and broadcast.

Optionally, the first SLRB is not a default SLRB.

According to the SLRB release method provided in this application, a condition for releasing an SLRB is clearly defined, so that a terminal device can release the SLRB on a proper occasion, thereby saving resources.

With reference to the fifth aspect, in some implementations of the fifth aspect, that no QoS flow with data is mapped to the first SLRB includes: All QoS flows with data that are mapped to the first SLRB have been released.

With reference to the fifth aspect, in some implementations of the fifth aspect, the first SLRB release information includes an identifier or an index of the first SLRB, and/or includes the first sidelink information.

With reference to the fifth aspect, in some implementations of the fifth aspect, the first SLRB release information is an RRC reconfiguration message. For example, the RRC reconfiguration message is a PC5-RRC reconfiguration message.

With reference to the fifth aspect, in some implementations of the fifth aspect, the first SLRB release information is sent by the second terminal device when the second terminal device needs to release a second SLRB associated with the first SLRB.

In a current technology, in some scenarios, for example, when a terminal device detects that a beam failure occurs on an interface between the terminal device and a network device, the terminal device needs to contend for a resource in an exceptional pool with another terminal device to perform sidelink transmission. This may cause a case in which the terminal device cannot obtain a resource through contention, thereby affecting service continuity.

According to a sixth aspect, a communication method is provided. The method includes: When a terminal device detects that a beam failure occurs on an interface between the terminal device and a network device, or in a process in which a terminal device performs detection on a beam failure on an interface between the terminal device and a network device, or when a terminal device is synchronized to a global navigation satellite system (GNSS), if a configured grant has been configured for the terminal device, sidelink transmission is performed by using the configured grant.

Optionally, if beamFailureDetectionTimer is running, the terminal device is in the process of performing detection on a beam failure on the interface between the terminal device and the network device.

According to the communication method provided in this application, when the beam failure occurs, or in the beam failure detection process, or when the terminal device is synchronized to the GNSS, the terminal device may preferentially use the configured grant that has been configured. Because the configured grant is dedicated to the terminal device, a collision caused by resource contention with another terminal device can be avoided, thereby ensuring service continuity of the terminal device, and meeting a QoS requirement.

Optionally, if no configured grant is configured for the terminal device, sidelink transmission is performed by using an exceptional pool.

Optionally, the configured grant includes a configured grant type 1 and a configured grant type 2. The configured grant type 1 can be directly used. The configured grant type 2 can be used after being activated by using DCI.

Optionally, after beam failure recovery is completed, the configured grant may still be used.

Optionally, after the beam failure recovery is completed, a media access control (MAC) layer of the terminal device notifies an RRC layer that the exceptional pool is not in use.

Optionally, the performing sidelink transmission by using the configured grant includes: The RRC layer of the terminal device indicates a lower layer to perform sidelink transmission by using the configured grant.

For example, the lower layer may be the media access control (MAC) layer.

For example, the exceptional pool may be configured by using RRC or a SIB, or through pre-configuration.

Optionally, if a configured grant has been configured for the terminal device, the configured grant that has been configured is preferentially used for transmission on an SL; or if no configured grant is configured, an exceptional pool is used for transmission on the SL.

Optionally, the preferentially using the configured grant that has been configured may be understood as follows: When resources of the configured grant and the exceptional pool overlap, the terminal device or a logical channel that is on the terminal device and that is allowed to use the configured grant uses the configured grant that has been configured, but does not use the exceptional pool.

Optionally, the foregoing solution is also applicable to a radio link failure, a physical layer link problem, a cell handover scenario, and the like. This is not specifically limited in the present invention.

Optionally, when the beam failure occurs, the terminal device may select the GNSS as a synchronization source.

According to a seventh aspect, a communication method is provided, including: A first service data adaptation protocol SDAP entity of a terminal device maps a first QoS flow to a first sidelink radio bearer SLRB based on first sidelink information and a first PC5 interface quality of service flow identifier PFI, or based on the first sidelink information and a first quality of service QoS parameter. The first sidelink information, the first QoS parameter, and the first PFI are all associated with the first QoS flow. The first sidelink information is used to identify a first sidelink. The first sidelink information includes one or more of first communication type information, a first source identifier, and a first destination identifier. The first communication type information is one of unicast, multicast, and broadcast. According to the communication method provided in this application, an SDAP entity of the terminal device may map a QoS flow to a corresponding SLRB.

Optionally, the terminal device includes the first SDAP entity, and the terminal device includes only one SDAP entity.

According to an eighth aspect, a communication method is provided, including: An upper layer of a terminal device delivers a first quality of service QoS flow to a first service data adaptation protocol SDAP entity based on first sidelink information. The first QoS flow is associated with the first sidelink information, a first PC5 interface quality of service flow identifier PFI, and a first quality of service QoS parameter. The first sidelink information is used to identify a first sidelink. The first sidelink information includes one or more of first communication type information, a first source identifier, and a first destination identifier. The first communication type information is one of unicast, multicast, and broadcast.

The first SDAP entity maps the first QoS flow to a first sidelink radio bearer SLRB based on the first PFI or the first QoS parameter.

According to the communication method provided in this application, the upper layer of the terminal device may deliver a QoS flow to a corresponding SDAP entity, and the SDAP entity may map the QoS flow to a corresponding SLRB.

Optionally, the terminal device includes SDAP entities, the plurality of SDAP entities include the first SDAP entity, and the plurality of SDAP entities are in a one-to-one correspondence with a plurality of sidelinks.

According to a ninth aspect, a communications apparatus is provided, including modules or units configured to perform the method in any one of the first aspect, the third aspect to the eighth aspect, or the possible implementations of the first aspect and the third aspect to the eighth aspect.

According to a tenth aspect, a communications apparatus is provided, including modules or units configured to perform the method in any one of the second aspect or the possible implementations of the second aspect.

According to an eleventh aspect, an apparatus is provided, including a processor. The processor is coupled to a memory, and may be configured to execute an instruction in the memory, so that the apparatus performs the method in any one of the first aspect, the third aspect to the eighth aspect, or the possible implementations of the first aspect and the third aspect to the eighth aspect. Optionally, the apparatus further includes the memory. Optionally, the apparatus further includes an interface circuit, and the processor is coupled to the interface circuit.

According to a twelfth aspect, an apparatus is provided, including a processor. The processor is coupled to a memory, and may be configured to execute an instruction in the memory, so that the apparatus performs the method in any one of the second aspect or the possible implementations of the second aspect. Optionally, the apparatus further includes the memory. Optionally, the apparatus further includes an interface circuit, and the processor is coupled to the interface circuit.

According to a thirteenth aspect, a processor is provided, including an input circuit, an output circuit, and a processing circuit. The processing circuit is configured to receive a signal by using the input circuit, and transmit a signal by using the output circuit, so that the processor performs the method in any one of the first aspect to the eighth aspect or the possible implementations of the first aspect to the eighth aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter, and transmitted by the transmitter. In addition, the input circuit and the output circuit may be a same circuit, and the circuit serves as the input circuit and the output circuit at different moments. Specific implementations of the processor and various circuits are not limited in this embodiment of this application.

According to a fourteenth aspect, a processing apparatus is provided, including a processor and a memory. The processor is configured to read an instruction stored in the memory, and may receive a signal by using a receiver, and transmit a signal by using a transmitter, to perform the method in any one of the first aspect to the eighth aspect or the possible implementations of the first aspect to the eighth aspect.

Optionally, there are one or more processors, and there are one or more memories.

Optionally, the memory may be integrated with the processor, or the memory and the processor are disposed separately.

During specific implementation, the memory may be a non-transitory memory, for example, a read-only memory (read only memory, ROM). The memory and the processor may be integrated on one chip, or may be separately disposed on different chips. A type of the memory and a manner of disposing the memory and the processor are not limited in this embodiment of this application.

It should be understood that a related data exchange process, for example, sending first QoS information, may be a process of sending controlling information by the processor, and receiving first QoS information may be a process of receiving the first QoS information by the processor. Specifically, data output by the processor may be output to a transmitter, and input data received by the processor may come from a receiver. The transmitter and the receiver may be collectively referred to as a transceiver.

The processing apparatus in the fourteenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated in the processor, or may be located outside the processor and exist independently.

According to a fifteenth aspect, a computer program product is provided. The computer program product includes a computer program (which may also be referred to as code or an instruction). When the computer program is run, a computer is enabled to perform the method in any one of the first aspect to the eighth aspect or the possible implementations of the first aspect to the eighth aspect.

According to a sixteenth aspect, a computer-readable medium is provided. The computer-readable medium stores a computer program (which may also be referred to as code or an instruction). When the computer program is run on a computer, the computer is enabled to perform the method in any one of the first aspect to the eighth aspect or the possible implementations of the first aspect to the eighth aspect.

According to a seventeenth aspect, a communications system is provided, including the foregoing network device and/or terminal device.

BRIEF DESCRIPTION OF THE DRAWINGS

FIG. 4 is a schematic flowchart of still another communication method according to an embodiment of this application;

FIG. 5 is a schematic flowchart of an SLRB establishment method according to an embodiment of this application;

FIG. 6 is a schematic flowchart of an SLRB reconfiguration method according to an embodiment of this application;

FIG. 7 is a schematic block diagram of an apparatus according to an embodiment of this application;

DETAILED DESCRIPTION OF ILLUSTRATIVE EMBODIMENTS

Figure 1:
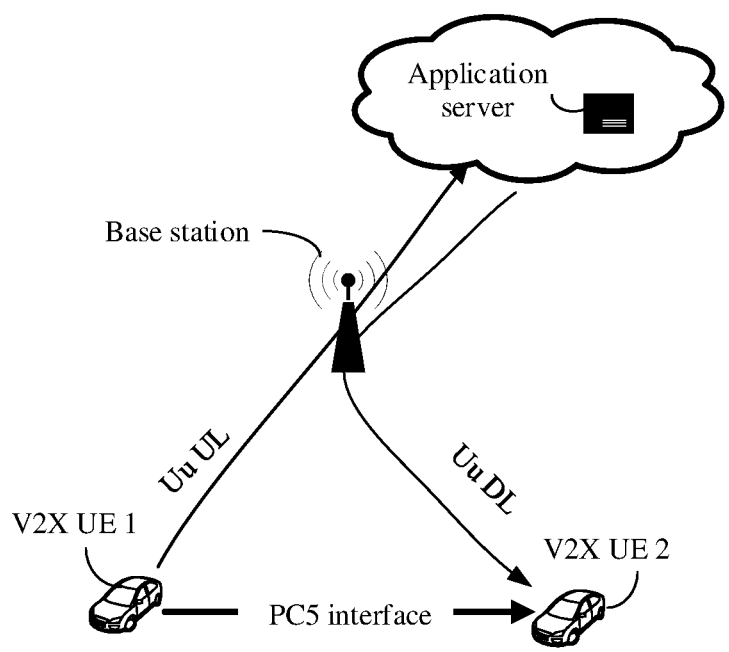
FIG. 1 is a schematic diagram of a V2X communications architecture.

The following describes technical solutions of this application with reference to accompanying drawings.

The technical solutions provided in this application may be used in a device-to-device (device to device, D2D) scenario, and optionally, may be used in an internet of vehicles (vehicle to everything, V2X) scenario. For example, the V2X scenario may be specifically any one of the following systems: vehicle-to-vehicle (vehicle to vehicle, V2V) communication, vehicle-to-pedestrian (vehicle to pedestrian, V2P) communication, a vehicle-to-network (vehicle to network, V2N) service, vehicle-to-infrastructure (vehicle to infrastructure, V2I) communication, and the like.

For example, D2D may be long term evolution (LTE) D2D or new radio (new radio, NR) D2D, or may be D2D in another communications system that may appear with development of technologies. Similarly, V2X may be LTE V2X or NR V2X, or may be V2X in another communications system that may appear with development of technologies.

In the embodiments of this application, a terminal device may be user equipment (UE), a vehicle, a vehicle-mounted sensor, an on-board unit (OBU), a roadside unit (RSU), a subscriber unit, a subscriber station, a mobile station, a mobile console, a remote station, a remote terminal, a mobile device, a user terminal, a terminal, a wireless communications device, a user agent, a user apparatus, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a wearable device, or the like.

In the embodiments of this application, a network device is an access network device. For example, the access network device may be an evolved NodeB (eNB or eNodeB) in an LTE system, a gNodeB (gNB) in a 5G or NR network, or a radio controller, a relay station, an access point, or a transmission and reception point (TRP) in a cloud radio access network (CRAN) scenario.

It should be understood that, in the embodiments of this application, the terminal device may be alternatively a chip, a communications apparatus with a D2D or V2X communication function, a unit, a module, or the like in a terminal device, for example, an in-vehicle communications apparatus, an in-vehicle communications module, or an in-vehicle communications chip.

In the embodiments of this application, the terminal device or the network device includes a hardware layer, an operating system layer running at the hardware layer, and an application layer running at the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a V2X communications architecture. As shown in FIG. 1, the architecture includes two communications interfaces: a PC5 interface and a Uu interface. The PC5 interface is a direct communications interface between V2X UEs (for example, V2X UE 1 and V2X UE 2 shown in the figure). A direct communication link between V2X UEs is also defined as a side-link or a sidelink (SL). Uu interface communication is a communication mode in which sender V2X UE (for example, the V2X UE 1) sends V2X data to a base station through the Uu interface, the base station sends the data to a V2X application server for processing, the V2X application server delivers processed data to a base station, and then the base station sends the data to receiver V2X UE (for example, the V2X UE 2). In the Uu interface communication mode, the base station that forwards the uplink data of the sender V2X UE to the application server and the base station that forwards the downlink data delivered by the application server to the receiver V2X UE may be a same base station, or may be different base stations. This may be specifically determined by the application server. It should be understood that the sending performed by the sender V2X UE to the base station is referred to as uplink (UL) transmission, and the sending performed by the base station to the receiver V2X UE is referred to as downlink (DL) transmission.

In a V2X scenario, when transmitting data through a sidelink, a terminal device needs to know SLRB configuration information corresponding to a QoS flow from a V2X layer. According to a conclusion in an existing protocol, a terminal device in an RRC connected state may report QoS information to a network device to request SLRB configuration information. However, a condition in which the terminal device reports the QoS information is not clearly defined in the prior art.

In view of this, this application provides a communication method. The method clearly defines a condition for triggering a terminal device to report QoS information.

The following describes the communication method provided in this application.

Figure 2:
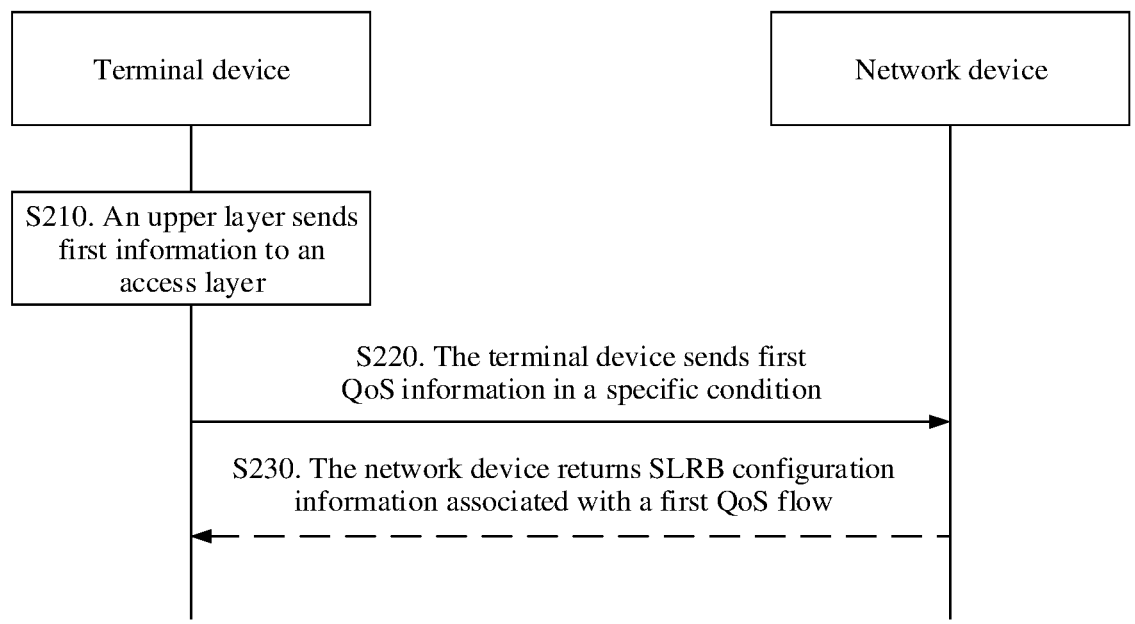
FIG. 2 is a schematic flowchart of a communication method according to an embodiment of this application.

FIG. 2 is a schematic flowchart of a communication method 200 according to this application. As shown in FIG. 2, the method may include S210 and S220. Optionally, the method may further include S230.

S210. An upper layer of a terminal device sends first information to an access layer of the terminal device. The first information is used to identify a first QoS flow.

The upper layer of the terminal device (referred to as the "upper layer" below) is a layer above the access layer of the terminal device (referred to as the "access layer" below). For example, the upper layer may be a V2X layer, an application layer, or a layer between a V2X layer and an application layer. For example, the access layer may include an RRC layer, an SDAP layer, a PDCP layer, an RLC layer, a MAC layer, and a PHY layer.

S220. When the access layer determines that the first QoS flow is a new QoS flow for which sidelink communication needs to be performed, or when the access layer determines that the first QoS flow is a new QoS flow for which sidelink communication needs to be performed and no mapping relationship from the first QoS flow to an SLRB is configured, or when the access layer determines that no mapping relationship from the first QoS flow to an SLRB is configured, report first QoS information for the first QoS flow to a network device.

Correspondingly, the network device receives the first QoS information reported by the terminal device. The first QoS information includes some or all content in the first information. Optionally, the first QoS information may further include identification information of the first QoS flow. It should be understood that the identification information of the first QoS flow is not a first PFI in the first information.

S230. The network device sends SLRB configuration information associated with the first QoS flow to the terminal device. Correspondingly, the terminal device receives the SLRB configuration information associated with the first QoS flow.

Optionally, the SLRB configuration information associated with the first QoS flow may be included in SLRB configuration information sent by the network device to the terminal device.

The SLRB configuration information may also be referred to as an SLRB configuration. The SLRB configuration information includes first configuration information, and the first configuration information may also be referred to as first SLRB configuration information. The first SLRB configuration information is the SLRB configuration information associated with the first QoS flow, in other words, the first configuration information is the SLRB configuration information associated with the first QoS information.

According to the method provided in this application, a condition for triggering the terminal device to report QoS information is clearly defined, so that the terminal device may report QoS information only when a specific condition is met, thereby avoiding reporting corresponding QoS information for each QoS flow or each data packet, and reducing signaling overheads.

The steps in the method 200 are described in detail below.

In S210, before sending the first QoS flow to the access layer, the upper layer may first send the first information to the access layer, to notify the access layer of related information about the first QoS flow to be sent.

Alternatively, when sending the first QoS flow (that is, a data packet corresponding to the first QoS flow) to the access layer, the upper layer indicates, to the access layer, the first information associated with the first QoS flow.

For example, in a first manner, the first information may include first sidelink information, the first PFI, and a first QoS parameter. In a second manner, the first information may include the first PFI and a first QoS parameter.

The first sidelink information, the first PFI, and the first QoS parameter are associated with each other.

The first sidelink information is used to identify a first sidelink. The first sidelink information may include one or more of first communication type information, a first source identifier, and a first destination identifier. Optionally, the first sidelink information may include the first communication type information, the first source identifier, and the first destination identifier. Alternatively, the first sidelink information may include only the first communication type information and the first destination identifier. Alternatively, the first sidelink information may include only the first source identifier and the first destination identifier. Alternatively, the first sidelink information may include only the first destination identifier. The first communication type information is one of unicast, multicast, and broadcast. In this application, a source identifier is a source layer 2 identifier, namely, a source layer 2 (L2) ID, and a destination identifier is a destination layer 2 identifier, namely, a destination L2 ID.

In this application, optionally, a QoS parameter may include one or more of the following: a PC5 interface fifth-generation communications system quality of service identifier (PC5 5G quality of service identifier, PQI), a guaranteed flow bit rate (GFBR), a maximum flow bit rate (MFBR), and a minimum required communication range (range). For example, the first QoS parameter may include one or more of the following: a first PQI, a first GFBR, a first MFBR, and a first range.

Optionally, a predefined index value may be used to indicate the GFBR.

For example, the network device may broadcast a list of GFBR ranges by using a system information block (SIB). The terminal device determines that an index value 0 indicates the $1^{st}$ GFBR range in the list, an index value 1 indicates the $2^{nd}$ GFBR range in the list, and so on. It should be understood that there is no intersection between any two GFBR ranges. The MFBR may also be indicated in a similar manner. For example, the first GFBR may be a GFBR range indicated by the index value 1, and the first MFBR may be an MFBR range indicated by the index value 1.

For another example, the network device may alternatively broadcast a list of GFBR lists by using a SIB. The terminal device determines that an index value 0 indicates the $1^{st}$ GFBR list in the list, an index value 1 indicates the $2^{nd}$ GFBR list in the list, and so on. Each GFBR in a GFBR list is represented by a specific value, and there is no intersection between any two GFBR lists. The MFBR may also be indicated in a similar manner. For example, the first GFBR may be a GFBR list indicated by the index value 1, and the first MFBR may be an MFBR list indicated by the index value 1.

For still another example, an index value may indicate a specific value of a GFBR rather than a range. For example, the first GFBR may be a GFBR with an index of 1, and the GFBR with the index of 1 indicates a GFBR value of 1 Mbps.

Optionally, two values may be used to identify a GFBR range, and respectively indicate a minimum value and a maximum value of the GFBR range. The MFBR may also be indicated in a similar manner. For example, the first GFBR is (1, 2), 1 indicates a GFBR of 1 Mbps, and 2 indicates a GFBR of 4 Mbps. In other words, the first GFBR indicates a GFBR value range of 1 Mbps to 4 Mbps.

Optionally, a predefined index value may be used to indicate values or value ranges (value lists) of all parameters in a QoS parameter. For example, meanings of parameters in a QoS parameter indicated by an index value 0 are as follows: A PQI is 1, a GFBR is (1 Mbps to 4 Mbps), an MFBR is (16 Mbps to 64 Mbps), and a range is 100 m. Alternatively, meanings of the parameters in the QoS parameter indicated by the index value 0 are as follows: The PQI is 1, the GFBR is (1 Mbps, 2 Mbps, 3 Mbps, or 4 Mbps), the MFBR is (16 Mbps, 20 Mbps, 32 Mbps, 48 Mbps, or 64 Mbps), and the range is 100 m.

S220 may be performed by the RRC layer of the access layer. However, this is not limited in this application.

In S220, before the terminal device reports QoS information for a QoS flow to the network device, a mapping relationship from the QoS flow to an SLRB may have been configured, or no mapping relationship from the QoS flow to an SLRB has been configured. In an implementation, provided that the QoS flow is the new QoS flow, the terminal device reports corresponding QoS information to the network device, to request a mapping relationship from the QoS flow to an SLRB. In another implementation, the terminal device reports corresponding QoS to the network device only when the QoS flow is the new QoS flow and no mapping relationship from the QoS flow to an SLRB has been configured. In still another implementation, provided that no mapping relationship from the QoS flow to an SLRB has been configured, corresponding QoS information is reported to the network device, without determining whether the QoS flow is the new QoS flow.

It should be understood that, in this specification, configuring a mapping relationship from the first QoS flow to an SLRB may also be understood as configuring an SLRB associated with the first QoS flow, or configuring the SLRB configuration information associated with the first QoS flow. In addition, that the first QoS flow needs to be mapped to an SLRB may also be understood as that the first QoS flow is associated with the SLRB, or the first QoS flow is associated with the SLRB configuration information.

The following describes how to determine whether the first QoS flow is a new QoS flow for which sidelink communication needs to be performed.

It should be noted that, in any one of the following manners of determining whether the first QoS flow is a new QoS flow for which sidelink communication needs to be performed, a PFI and a QoS parameter that are associated with the first sidelink information and that are stored at the access layer comply with the following principle: Each PFI is associated with one QoS parameter, and PFIs are associated with different QoS parameters.

Manner 1

If the PFI that is associated with the first sidelink information and that is stored (or currently configured) at the access layer does not include the first PFI, and the QoS parameter associated with the first sidelink information does not include the first QoS parameter, it is determined that the first QoS flow is a new QoS flow.

For ease of description by using an example, the first PFI and the first QoS parameter are respectively denoted as a PFI #1 and a QoS parameter #1 herein.

For example, it is assumed that, before the first information is received, an association relationship between the first sidelink information, the PFI, and the QoS parameter that are stored at the access layer is shown in Table 1.

TABLE 1

| | PFI | PFI #2 | PFI #3 | PFI #4 |
| --- | --- | --- | --- | --- |
| First sidelink information | QoS parameter | QoS parameter #2 | QoS parameter #3 | QoS parameter #4 |

Referring to Table 1, it can be learned that the PFI that is associated with the first sidelink information and that is stored at the access layer does not include the PFI #1, and the QoS parameter associated with the first sidelink information does not include the QoS parameter #1. Therefore, it is determined that the first QoS flow is a new QoS flow.

Manner 2

If the PFI that is associated with the first sidelink information and that is stored at the access layer does not include the first PFI, it is determined that the first QoS flow is a new QoS flow.

Optionally, if the PFI that is associated with the first sidelink information and that is stored at the access layer does not include the first PFI, but the stored QoS parameter associated with the first sidelink information includes the first QoS parameter, the access layer determines that the first QoS flow is not a new QoS flow. Assuming that a PFI that is associated with both the first sidelink information and the first QoS parameter and that is stored at the access layer is a PFI #5, and an SLRB #5 to which a QoS flow corresponding to the PFI #5 is mapped already exists, the access layer of the terminal device updates a mapping relationship from the first sidelink information, the PFI #5, and the first QoS parameter to the SLRB #5 to a mapping relationship from the first sidelink information, the PFI #1, and the first QoS parameter to the SLRB #5.

Manner 3

If the QoS parameter that is associated with the first sidelink information and that is stored at the access layer does not include the first QoS parameter, it is determined that the first QoS flow is a new QoS flow.

Manner 4

If a PFI stored at the access layer does not include the first PFI, and a stored QoS parameter does not include the first QoS parameter, it is determined that the first QoS flow is a new QoS flow.

Manner 5

If a PFI stored at the access layer does not include the first PFI, it is determined that the first QoS flow is a new QoS flow.

Optionally, if the PFI stored at the access layer does not include the first PFI, but a stored QoS parameter includes the first QoS parameter, the access layer determines that the first QoS flow is not a new QoS flow. Assuming that a PFI that is associated with the first QoS parameter and that is stored at the access layer is a PFI #5, and an SLRB #5 to which a QoS flow corresponding to the PFI #5 is mapped already exists, the access layer of the terminal device updates a mapping relationship from the first sidelink information, the PFI #5, and the first QoS parameter to the SLRB #5 to a mapping relationship from the first sidelink information, the PFI #1, and the first QoS parameter to the SLRB #5.

Manner 6

If a QoS parameter stored at the access layer does not include the first QoS parameter, it is determined that the first QoS flow is a new QoS flow.

Optionally, any one of the manner 1, the manner 2, and the manner 3 that are described herein may be combined with the first manner for the first information in S210, and any one of the manner 4, the manner 5, and the manner 6 may be combined with the second manner for the first information in S210. However, this is not limited in this application.

In addition, in S220, if the access layer determines that the first QoS flow is a new QoS flow, the access layer may store an association relationship between the first sidelink information, the first PFI, and the first QoS parameter.

Optionally, in the descriptions of this application, the configuring a mapping relationship from the first QoS flow to an SLRB does not include configuring a mapping relationship from the first QoS flow to a default SLRB.

Optionally, when reporting the first QoS information, the terminal device may further report QoS information that has been reported before. In other words, in addition to reporting the first QoS information for the first QoS flow, other QoS information may be further reported, and the QoS information has been reported to the network device before.

Optionally, the first QoS information may be sent by using a sidelink user equipment information (sidelink UE information, SUI) message or another RRC message.

The following describes possible designs of the first QoS information in S220, and the SLRB configuration information and the first SLRB configuration information in S230.

1. First QoS information

Design 1: The first QoS information may include the first QoS parameter and the first communication type information.

Design 2: The first QoS information may include the first PFI, the first QoS parameter, and the first sidelink information.

Design 3: The first QoS information may include the first PFI and the first QoS parameter. Optionally, the first QoS information may further include the first communication type information.

2. SLRB configuration information

In this application, an SLRB may include an SL signaling radio bearer (sidelink signaling radio bearer, SL-SRB) and an SL-DRB. In other words, the SLRB configuration information may include SL-DRB configuration information and SL-SRB configuration information. In this specification, the SL-DRB is mainly described.

In a possible implementation, the SLRB configuration information sent by the network device to the terminal device in S230 may be used to configure one or more SL-DRBs, in other words, the SLRB configuration information may include one or more pieces of SL-DRB configuration information. Optionally, the SLRB configuration information may be further used to modify one or more SL-DRBs. Optionally, the SLRB configuration information may be further used to release one or more SL-DRBs.

For example, the SLRB configuration information may include an addition list, for example, denoted as SLDRB-ToAddList. The list may include an ID of an SL-DRB to be configured (in other words, added or established). In addition, the SLRB configuration information further includes configuration information corresponding to an ID of each SL-DRB to be configured. The SLRB configuration information may further include a modification list, for example, denoted as SLDRB-ToModList. The list may include an ID of an SL-DRB to be modified (in other words, reconfigured or re-established). In addition, the SLRB configuration information further includes configuration information corresponding to an ID of each SL-DRB to be modified.

For another example, the SLRB configuration information may include an addition/modification list, for example, denoted as SLDRB-ToAddModList. The list may include an ID of an SL-DRB to be configured/modified. In addition, the SLRB configuration information further includes configuration information corresponding to an ID of each SL-DRB to be configured/modified. Specifically, if some SL-DRB IDs in the SLDRB-ToAddModList are not included in SLDRB-ToAddModList in SLRB configuration information previously received (in other words, currently stored or currently configured) by the terminal device, it is considered that SL-DRBs corresponding to the SL-DRB IDs are SL-DRBs to be configured (in other words, "added"); and if some SL-DRB IDs in the SLDRB-ToAddModList are included in the SLDRB-ToAddModList in the SLRB configuration information previously received by the terminal device, it is considered that SL-DRBs corresponding to the SL-DRB IDs are SL-DRBs to be modified, in other words, the SL-DRBs corresponding to the SL-DRB IDs are SL-DRBs to be reconfigured or re-established.

Optionally, the SLRB configuration information may further include a release list, for example, denoted as SLDRB-ToReleaseList. The list includes an ID of an SL-DRB to be released. After receiving the SLRB configuration information, the terminal device releases an SL-DRB corresponding to an SL-DRB ID in the SLDRB-ToReleaseList.

For example, one piece of SL-DRB configuration information, that is, configuration information corresponding to one SL-DRB ID, may include one piece of SDAP entity configuration information. It should be understood that, that one piece of SL-DRB configuration information may include one piece of SDAP entity configuration information may also be understood that the SDAP entity configuration information is associated with the SL-DRB configuration information. That one piece of SDAP entity configuration information is associated with one piece of SL-DRB configuration information may be embodied as follows: The SDAP entity configuration information includes an SL-DRB ID corresponding to the SL-DRB configuration information. That one piece of SDAP entity configuration information is associated with one piece of SL-DRB configuration information may also be understood as follows: The SDAP entity configuration information is associated with an SL-DRB indicated by an SL-DRB ID corresponding to the SL-DRB configuration information.

Optionally, one piece of SDAP entity configuration information may include one or more of the following (1) to (5).

(1) Information about an added QoS flow that is mapped to an SL-DRB associated with the SDAP entity configuration information.

It is assumed that the added QoS flow herein is a QoS flow #1 and a QoS flow #2, and the SL-DRB associated with the SDAP entity configuration information is an SL-DRB #1. This means that the QoS flow #1 and the QoS flow #2 need to be mapped to the SL-DRB #1. In other words, the network device has not configured a mapping relationship from the QoS flow #1 and the QoS flow #2 to an SL-DRB for the terminal device before, and the network device currently configures, by using the SLRB configuration information, a mapping relationship from the QoS flow #1 and the QoS flow #2 to an SL-DRB as follows: mapping the QoS flow #1 and the QoS flow #2 to the SL-DRB #1.

(2) Information about a released QoS flow that is mapped to an SL-DRB associated with the SDAP entity configuration information. It is assumed that the released QoS flow herein is a QoS flow #3 and a QoS flow #4, and the SL-DRB associated with the SDAP entity configuration information is an SL-DRB #1. This means that the network device indicates the terminal device to release a mapping relationship from the QoS flow #3 and the QoS flow #4 to the SL-DRB #1.

It should be noted that, for (1) and (2), the information about the QoS flow may be some or all of the following parameters associated with the QoS flow: a PFI, a QoS parameter, a resource allocation mode, a communication type, source identification information (that is, a source L2 ID), destination identification information (that is, a destination L2 ID), and connection identification information. The resource allocation mode is one of a mode 1 and a mode 2. In the mode 1, the network device allocates, through scheduling, a resource for performing sidelink transmission to the terminal device. In the mode 2, the terminal device needs to select, from a resource pool, a resource for performing sidelink transmission. The connection identification information is information obtained by converting the source identification information and the destination identification information. The information about the QoS flow is described in detail below with reference to the first SLRB configuration information. Details are not described herein.

(3) Indication information about whether the SL-DRB configuration information is a default SL-DRB configuration.

(4) SDAP-layer packet header information.

(5) SDAP entity identification information: an ID used to identify an SDAP entity corresponding to the SDAP entity configuration information Optionally, one piece of SL-DRB configuration information may further include one or more of the following: packet data convergence protocol PDCP entity configuration information, radio link control RLC entity configuration information, and logical channel LCH configuration information.

For example, the PDCP entity configuration information may include at least one of the following:

a discardTimer timer used to control storage duration of a PDCP SDU in a PDCP buffer;

a t-Reordering timer used to wait for out-of-order data packets in a reordering function;

whether a PDCP layer can deliver out-of-order data packets to an upper layer;

whether to use sidelink data compression at the PDCP layer, and related configurations for sidelink data compression, for example, a size of a compression buffer and a dictionary used for compression;

a sequence number (SN) length used for a PDU at the PDCP layer;

a security configuration used for a PDCP entity, including whether encryption and/or integrity protection are/is used;

security algorithms (an integrity protection algorithm and an encryption algorithm), a key, and/or the like used for a PDCP entity;

whether a duplication mechanism and a duplication configuration are used for a PDCP entity, where if the duplication mechanism is used, the PDCP entity corresponds to two or more RLC entities and LCHs, and the duplication mechanism herein means that the PDCP entity replicates a PDCP PDU and delivers PDCP PDUs to two or more associated RLC entities for processing and transmission; and related configurations for a PDCP-layer header compression algorithm, for example, whether to use header compression.

The duplication mechanism means that a PDCP entity replicates a PDCP PDU and delivers PDCP PDUs to two or more associated RLC entities for processing and transmission.

For example, the RLC entity configuration information may include at least one of the following:

a mode used for an RLC entity: an acknowledged mode (AM), an unacknowledged mode (UM), or a transparent mode (TM).

If a sending RLC entity is configured to use the AM, an RLC configuration further includes at least one of the following: a sequence number (SN) length of an RLC-layer PDU, a t-PollRetransmit timer for controlling initiation of polling retransmission (polling means that a transmit-end AM RLC entity indicates, by using a polling bit in a MAC PDU, a receive-end AM RLC entity to perform status report feedback), a pollPDU parameter for controlling a quantity of RLC PDUs to be sent before polling needs to be initiated, a pollByte parameter for controlling a quantity of bytes of RLC PDUs to be sent before polling needs to be initiated, and a maximum quantity of retransmissions at an RLC layer: maxRetxThreshold.

If a sending RLC entity is configured to use the UM, an RLC entity configuration further includes: an SN length of an RLC-layer PDU.

If a receiving RLC entity is configured to use the AM, an RLC configuration further includes at least one of the following: an SN length of an RLC-layer PDU, a t-Reassembly timer for controlling an RLC layer to wait for a segment, and a t-StatusProhibit timer for controlling the RLC layer to avoid frequently sending a status report.

If a receiving RLC entity is configured to use the UM, an RLC entity configuration further includes at least one of the following: an SN length of an RLC-layer PDU, and a t-Reassembly timer for controlling an RLC layer to wait for a segment.

For example, an LCH configuration may specifically include at least one of the following:

an LCH identifier or an LCH index;

an identifier of a logical channel group to which an LCH belongs;

related parameters for performing logical channel prioritization processing: a priority, a prioritized bit rate (prioritisedBitRate, PBR), and a token bucket size and duration;

information about a carrier that can be used to transmit data on the LCH;

information about a resource allocation mode that can be used to transmit data on the LCH, for example, a mode 1 (the mode-1 corresponds to a resource scheduling mode of a base station), a mode 2 (the mode-2 corresponds to a resource selection mode of UE), or the mode 1 and the mode 2;

numerology information of a resource that can be used to transmit data on the LCH, for example, a subcarrier spacing, a cyclic prefix length, time-domain duration of the resource, and whether the resource may be a configured grant resource;

For example, the terminal device may establish an SL-DRB based on the first SL-DRB configuration information for the first sidelink, and may further establish an SL-DRB based on the first SL-DRB configuration information for another sidelink associated with the first QoS parameter.

For example, the first SDAP configuration information is as follows:

```
SL-V2X-SDAP-Config-r16::=        SEQUENCE {
    defaultDRB              BOOLEAN,
    mappedQoS-FlowsToAdd         SEQUENCE (SIZE (1..maxNrofQFIs)) OF QoS
parameters          OPTIONAL, -- Need N
    mappedQoS-FlowsToRelease     SEQUENCE (SIZE (1..maxNrofQFIs)) OF QoS
parameters          OPTIONAL, -- Need N
    ...
}
QoS parameters ::=              SEQUENCE (PQI,GFBR,MFBR,range)
PQI ::=             INTEGER (0..maxPQI)
GFBR ::=            INTEGER (0..maxGFBR)
MFBR ::=            INTEGER (0..maxMFBR)
range ::=           INTEGER (0..maxrange)
``` an SR-mask parameter for controlling whether the LCH can trigger an SR; and an SR-DelayTimerApplied parameter for controlling whether the LCH can trigger an SR in a delayed manner.

3. First SLRB configuration information, that is, the SLRB configuration information associated with the first QoS flow In this application, the SLRB configuration information includes the first SLRB configuration information, and the first SLRB configuration information is configuration information that is in the SLRB configuration information and that corresponds to an ID of an SL-DRB to be configured or added. The first SLRB configuration information includes first SL-DRB configuration information and SL-SRB configuration information. In this application, the first SL-DRB configuration information is mainly described. The first SL-DRB configuration information includes first SDAP entity configuration information.

Optionally, the first SLRB configuration information may be further obtained by using a SIB or through pre-configuration.

The first SDAP entity configuration information includes information about the first QoS flow. It should be understood that the first QoS flow is a QoS flow that needs to be added to the first SDAP entity configuration information and that is mapped to an SL-DRB corresponding to the first SL-DRB configuration information.

The following describes possible designs of the information about the first QoS flow.

Design 1

The information about the first QoS flow includes the first QoS parameter, that is, the first SDAP entity configuration information may include the first QoS parameter. Optionally, the information about the first QoS flow may further include the first communication type information, that is, the first SDAP entity configuration information may further include the first communication type information, or the first communication type information is associated with the first SDAP entity configuration information.

It should be understood that, if content of the information about the first QoS flow is shown in the design 1, the terminal device may establish corresponding SL-DRBs based on the first SL-DRB configuration information for different sidelinks associated with the first QoS parameter.

Design 2

The information about the first QoS flow includes a second QoS parameter, that is, the first SDAP entity configuration information may include the second QoS parameter. Optionally, the information about the first QoS flow may further include the first communication type information, that is, the first SDAP entity configuration information may further include the first communication type information, or the first communication type information is associated with the first SDAP entity configuration information.

The second QoS parameter meets the following condition:

When a QoS parameter (including the first QoS parameter and the second QoS parameter) includes a GFBR, a value or a value range or a value list corresponding to a GFBR in the second QoS parameter includes a value range or a value list corresponding to a GFBR in the first QoS parameter. When a QoS parameter includes an MFBR, a value range or a value list corresponding to an MFBR in the second QoS parameter includes a value or a value range or a value list corresponding to an MFBR in the first QoS parameter. When a QoS parameter includes a PQI, a PQI in the second QoS parameter is the same as a PQI in the first QoS parameter. When a QoS parameter includes a range, a range in the second QoS parameter is the same as a range in the first QoS parameter.

It should be understood that, if content of the information about the first QoS flow is shown in the design 2, the terminal device may establish, based on the first SL-DRB configuration information, a corresponding SL-DRB for a sidelink associated with a QoS parameter whose value range falls within a value range (or a value list) corresponding to the second QoS parameter. For example, the terminal device may establish an SL-DRB based on the first SL-DRB configuration information for the first sidelink, and may further establish an SL-DRB based on the first SL-DRB configuration information for another sidelink associated with a QoS parameter whose value range falls within the value range corresponding to the second QoS parameter.

Optionally, the design 1 and the design 2 herein may be combined with the design 1 of the first QoS information in the foregoing descriptions. However, this is not limited in this application.

Optionally, the design 1 and the design 2 herein may be combined with the manner 3 of determining whether the first QoS flow is the new QoS flow for which sidelink communication needs to be performed. However, this is not limited in this application.

Design 3

The information about the first QoS flow may include the first PFI, that is, the first SDAP entity configuration information may include the first PFI. When the first sidelink information includes the first communication type information, the first SDAP entity configuration information may further include the first communication type information, or the first communication type information is associated with the first SDAP entity configuration information, and the first SDAP entity configuration information may further include content other than the first communication type information in the first sidelink information, for example, the first source identifier and the first destination identifier. When the first sidelink information does not include the first communication type information, the first SDAP entity configuration information may further include the first sidelink information.

It should be understood that, if content of the information about the first QoS flow is shown in the design 3, only one SL-DRB can be established based on one piece of SDAP configuration information (or SLRB configuration information), and the SL-DRB is an SL-DRB for a specific sidelink.

For example, the first SDAP configuration information is as follows:

```
SL-V2X-SDAP-Config-r16::=         SEQUENCE {
    SDAPinfo              V2X-SDAPinfo
    defaultDRB            BOOLEAN,
    mappedQoS-FlowsToAdd          SEQUENCE (SIZE (1..maxNrofQFIs)) OF PFI
OPTIONAL, -- Need N
    mappedQoS-FlowsToRelease      SEQUENCE (SIZE (1..maxNrofQFIs)) OF PFI
OPTIONAL, -- Need N
    ...
}
V2X-SDAPinfo ::=          sequence{
    casttype ::=          ENUMERATED {U,G,B}         OPTIONAL,
    sourceL2ID ::         BIT STRING (SIZE (24))     OPTIONAL,
    destiantionL2ID ::    BIT STRING (SIZE (24))     OPTIONAL
}
PFI ::=                   INTEGER (0..maxPFI)
source L2 ID::= BIT STRING (SIZE (24))
destination L2 ID::= BIT STRING (SIZE (24))
```

Optionally, the design 3 herein may be combined with the design 2 of the first QoS information in the foregoing descriptions. However, this is not limited in this application.

Optionally, the design 3 herein may be combined with the manner 1 or the manner 2 of determining whether the first QoS flow is the new QoS flow for which sidelink communication needs to be performed. However, this is not limited in this application.

Design 4

The information about the first QoS flow may include the first PFI, that is, the first SDAP entity configuration information may include the first PFI. Optionally, when the first QoS information includes the first communication type information, the first SDAP entity configuration information is associated with the first communication type information.

It should be understood that, if content of the information about the first QoS flow is shown in the design 4, the terminal device may establish corresponding SL-DRBs based on the first SL-DRB configuration information for different sidelinks associated with the first PFI. For example, the terminal device may establish an SL-DRB based on the first SL-DRB configuration information for the first sidelink, and may further establish an SL-DRB based on the first SL-DRB configuration information for another sidelink associated with the first PFI.

For example, the first SDAP configuration information is as follows:

```
SL-V2X-SDAP-Config-r16::=         SEQUENCE {
    defaultDRB            BOOLEAN,
    mappedQoS-FlowsToAdd          SEQUENCE (SIZE (1..maxNrofQFIs)) OF PFI
OPTIONAL, -- Need N
    mappedQoS-FlowsToRelease      SEQUENCE (SIZE (1..maxNrofQFIs)) OF PFI
OPTIONAL, -- Need N
    ...
}
PFI ::=                   INTEGER (0..maxPFI)
```

Optionally, the design 4 herein may be combined with the design 3 of the first QoS information in the foregoing descriptions. However, this is not limited in this application.

Optionally, the design 4 herein may be combined with the manner 4 to the manner 6 of determining whether the first QoS flow is the new QoS flow for which sidelink communication needs to be performed. However, this is not limited in this application.

Optionally, the first SL-DRB configuration information may further include one or more of the following that is associated with a first SL-DRB: PDCP entity configuration information, RLC entity configuration information, and LCH configuration information. For details, refer to the foregoing descriptions. Details are not described herein again.

In this application, an SDAP entity of the terminal device may be configured in two manners.

Optionally, the SDAP entity configuration manners in this application are applicable to all of an RRC idle state, an RRC inactive state, and an OOC state.

This application further provides a communication method, including: A first service data adaptation protocol SDAP entity of a terminal device maps a first QoS flow to a first sidelink radio bearer SLRB based on first sidelink information and a first PC5 interface quality of service flow identifier PFI, or based on the first sidelink information and a first quality of service QoS parameter. The first sidelink information, the first QoS parameter, and the first PFI are all associated with the first QoS flow. The first sidelink information is used to identify a first sidelink. The first sidelink information includes one or more of first communication type information, a first source identifier, and a first destination identifier. The first communication type information is one of unicast, multicast, and broadcast. According to the communication method provided in this application, an SDAP entity of the terminal device may map a QoS flow to a corresponding SLRB.

Optionally, the method may be combined with an SDAP entity configuration manner 1 in the following descriptions.

This application further provides a communication method, including: An upper layer of a terminal device delivers a first quality of service QoS flow to a first service data adaptation protocol SDAP entity based on first sidelink information. The first QoS flow is associated with the first sidelink information, a first PC5 interface quality of service flow identifier PFI, and a first quality of service QoS parameter. The first sidelink information is used to identify a first sidelink. The first sidelink information includes one or more of first communication type information, a first source identifier, and a first destination identifier. The first communication type information is one of unicast, multicast, and broadcast.

The first SDAP entity maps the first QoS flow to a first sidelink radio bearer SLRB based on the PFI or the first QoS parameter.

According to the communication method provided in this application, the upper layer of the terminal device may deliver a QoS flow to a corresponding SDAP entity, and the SDAP entity may map the QoS flow to a corresponding SLRB.

Optionally, the method may be combined with an SDAP entity configuration manner 2 in the following descriptions.

SDAP entity configuration manners:
Manner 1:
One terminal device has only one SDAP entity.
Optionally, for the first manner of the first information in the foregoing descriptions, the terminal device may have only one SDAP entity. For example, when the first SDAP configuration information includes the information about the first QoS flow in the design 1 or the design 2, that is, when the first SDAP configuration information does not include the first sidelink information, different sidelink information between the terminal device and another terminal device is all associated with the first SDAP entity configured based on the first SDAP entity configuration information.

For another example, for the second manner of the first information, the terminal device may have only one SDAP entity. For example, the terminal device has only the first SDAP entity, and different sidelink information between the terminal device and another terminal device are all associated with the first SDAP entity configured based on the first SDAP entity configuration information.

Manner 2:
Each piece of sidelink information corresponds to (in other words, "is associated with") one SDAP entity, different SDAP entities are associated with different sidelink information, and one piece of sidelink information indicates one sidelink.

One piece of sidelink information may include one or more of communication type information, a source identifier, and a destination identifier. Optionally, the sidelink information may include the communication type information, the source identifier, and the destination identifier. Alternatively, the sidelink information may include only the communication type information and the destination identifier. Alternatively, the sidelink information may include only the source identifier and the destination identifier. The communication type information may be one of unicast, multicast, and broadcast. For example, communication type information included in one piece of sidelink information is unicast, and communication type information included in another piece of sidelink information is multicast.

For example, for the first manner of the first information in the foregoing descriptions, each piece of sidelink information may be associated with one SDAP entity, and one SDAP entity is associated with only one piece of sidelink information. For example, when the first SDAP configuration information includes the information about the first QoS flow in the design 3, that is, when the first SDAP configuration information includes the first source identifier and/or the first destination identifier, the first sidelink information may be associated with the first SDAP entity configured based on the first SDAP entity configuration information.

It should be noted that, unless otherwise specified, for meanings, related designs, and the like of phrases or terms that appear in the following descriptions and that are the same as those in the foregoing descriptions, reference may be made to the foregoing descriptions, and details are not repeated below.

Figure 3:
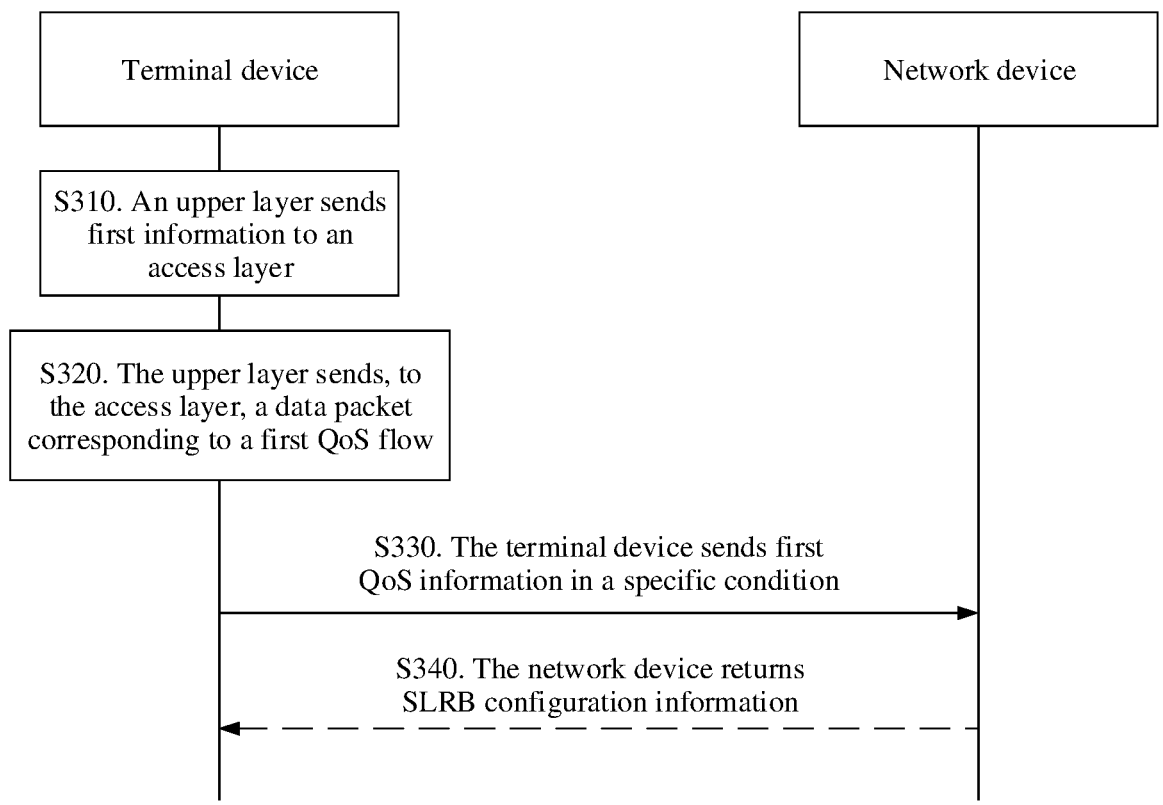
FIG. 3 is a schematic flowchart of another communication method according to an embodiment of this application.

FIG. 3 is a schematic flowchart of another communication method according to this application. As shown in FIG. 3, the method 300 may include S310 to S330. Optionally, the method may include S340.

S310. An upper layer of a terminal device sends first information to an access layer of the terminal device. The first information is used to identify a first QoS flow.

For example, before sending the first QoS flow to the access layer, the upper layer may first send the first information to the access layer, to notify the access layer of related information about the first QoS flow to be sent. Then the upper layer may send the first QoS flow to the access layer, in other words, send a data packet corresponding to the first QoS flow. It should be understood that, in this case, the first information may be sent only once before a data packet is sent, and does not need to be sent each time before each data packet corresponding to the first QoS flow is sent.

S320. The access layer receives a first data packet that corresponds to the first QoS flow and that is sent by the upper layer.

The first data packet is one of data packets corresponding to the first QoS flow, and is not specifically limited in this application. For each data packet corresponding to the first QoS flow, determining similar to that performed on the first data packet in S330 may be performed on the data packet, to determine whether to send the first QoS information.

It should be understood that, alternatively, there may be no sequence between S310 and S320. For example, when sending the first QoS flow (that is, the data packet corresponding to the first QoS flow) to the access layer, the upper layer may send, to the access layer, the first information associated with the first QoS flow.

S330. When a first PFI associated with the first data packet is a new PFI, or when a first PFI associated with the first data packet is an existing PFI and an association relationship between the first PFI and a first QoS parameter changes, the access layer reports the first QoS information to a network device. Correspondingly, the network device receives the first QoS information reported by the terminal device.

If the access layer has not received a data packet associated with the first PFI before, or if the access layer has received a data packet associated with the first PFI before but an association relationship between the first PFI and a QoS parameter changes subsequently, it is determined that the first PFI associated with the first data packet is the new PFI.

If the access layer has received a data packet associated with the first PFI before, and an association relationship between the first PFI and a QoS parameter has not changed, it is determined that the first PFI associated with the first data packet is an existing PFI.

S340. The network device sends SLRB configuration information to the terminal device. Correspondingly, the terminal device receives the SLRB configuration information. The SLRB configuration information includes first SLRB configuration information.

According to the method provided in this application, a condition for triggering the terminal device to report QoS information is clearly defined, so that the terminal device may report QoS information only when a specific condition is met, thereby avoiding reporting corresponding QoS information for each QoS flow or each data packet, and reducing signaling overheads.

FIG. 4 is a schematic flowchart of another communication method according to this application. As shown in FIG. 4, the method includes S410 and S420. Optionally, the method may further include S430.

S410. An upper layer of a terminal device sends second information to an access layer of the terminal device. The second information is used to indicate that the upper layer is to release or has released a second QoS flow.

S420. The access layer sends second QoS information to a network device based on the second information. The second QoS information is used to indicate to the network device that the terminal device is to release or has released the second QoS flow. Correspondingly, the network device receives the second QoS information.

S430. The network device updates, based on the received second QoS information, SLRB configuration information to be sent to the terminal device.

For example, updated SLRB configuration information may not include a mapping relationship from the second QoS flow to an SLRB, or updated SLRB configuration information may not include SLRB configuration information associated with the second QoS flow.

It should be understood that S430 may alternatively not be performed. For example, the network device receives the second QoS information, and subsequently does not trigger updating of the SLRB configuration information to be sent to the terminal device.

According to the method provided in this application, a condition for triggering the terminal device to report QoS information is clearly defined, so that the terminal device may report QoS information only when a specific condition is met, thereby avoiding signaling overheads caused by frequently reporting QoS information. Further, the terminal device reports a release of a QoS flow to the network device, so that the network device may release a resource or a configuration related to the QoS flow, thereby reducing overheads.

In S410, the second information may include a second PFI and second sidelink information that are associated with the second QoS flow. The second sidelink information is used to identify a second sidelink. Optionally, the second information may include only the second PFI, and does not include the second sidelink information.

The second sidelink information may include one or more of second communication type information, a second source identifier, and a second destination identifier. The second communication type information is one of unicast, multicast, and broadcast.

Optionally, the second sidelink information may include the second communication type information, the second source identifier, and the second destination identifier. Alternatively, the second sidelink information may include only the second communication type information and the second destination identifier. Alternatively, the second sidelink information may include only the second source identifier and the second destination identifier. Alternatively, the second sidelink information may include only the second destination identifier.

Optionally, the second QoS information may be sent by using an SUI message or another RRC message.

In S420, in a manner, the second QoS information may include some or all content in the second information.

For example, the second QoS information may include a second QoS parameter and the second communication type information that are associated with the second QoS flow.

For another example, the second QoS information may include the second PFI, a second QoS parameter, and the second sidelink information.

For still another example, the second QoS information may include the second PFI and a second QoS parameter. Optionally, the second QoS information may further include the second communication type information.

In another manner, the second QoS information may include information about at least one QoS flow. The information about the at least one QoS flow does not include information about the second QoS flow. The second QoS information includes information that is about a QoS flow and that is previously sent by the terminal device to the network device, and the information about the second QoS flow is included in QoS information previously sent by the terminal device to the network device. In this manner, that the terminal device is to release the second QoS flow may be implicitly indicated.

For example, information about a QoS flow may include one or more of a PFI, sidelink information, and a QoS parameter that are associated with the QoS flow.

Optionally, QoS information that has been reported before may be further reported when the second QoS information is reported. This application further provides a communication method, including: A terminal device sends third QoS information to a network device when the terminal device completes establishment of a unicast connection (including a PC5-S connection or a PC5-RRC connection) or when the terminal device initiates establishment of a unicast connection (for example, sending a direct communication request message to establish a PC5-S connection). For content and functions of the third QoS information, refer to S210 to S230.

This application further provides a communication method, including: A terminal device sends fourth QoS information to a network device when the terminal device determines that a QoS requirement of a fourth QoS flow is not met (for example, a delay, reliability, or a rate of actual QoS transmission does not meet a specified QoS requirement). According to the method, the network device may learn that the QoS requirement of the fourth QoS flow is not met, so that the network device may adjust a mapping relationship from a QoS flow to an SLRB to meet the QoS requirement of the fourth QoS flow, or the network device adjusts SLRB configuration information associated with the fourth QoS flow to meet the QoS requirement of the fourth QoS flow.

Optionally, an upper layer of the terminal device may first send fourth information to an access layer of the terminal device. If the access layer determines that the QoS requirement of the fourth QoS flow is not met, the access layer sends the fourth QoS information to the network device.

Optionally, if the access layer of the terminal device determines that the QoS requirement of the fourth QoS flow is not met, the access layer of the terminal device sends the fourth QoS information to the upper layer of the terminal device, to indicate that the QoS requirement of the fourth QoS flow is not met.

Optionally, when the access layer of the terminal device determines that the fourth QoS flow has no corresponding SLRB, the access layer of the terminal device sends the fourth QoS information to the upper layer of the terminal device, to indicate that the QoS requirement of the fourth QoS flow is not met.

For example, that the fourth QoS flow has no corresponding SLRB may be understood as that the terminal device cannot obtain the SLRB configuration information associated with the fourth QoS flow, where the SLRB configuration information may further include default SLRB configuration information; or may be understood as that the terminal device has no SLRB to which the fourth QoS flow can be mapped.

According to the method, the upper layer of the terminal device learns that the QoS requirement of the fourth QoS flow is not met, so that the upper layer may adjust the QoS requirement corresponding to the fourth QoS flow, or the upper layer indicates the access layer to release the fourth QoS flow.

The fourth information is used to indicate that the upper layer is to send the fourth QoS flow. The fourth QoS information may include some or all content in the fourth information.

The fourth information includes one or more of a fourth PFI, a fourth QoS parameter, and fourth sidelink information. The fourth PFI, the fourth QoS parameter, and the fourth sidelink information are associated with each other. The fourth sidelink information is used to identify a fourth sidelink. The fourth sidelink information may include one or more of fourth communication type information, a fourth source identifier, and a fourth destination identifier. The fourth communication type information is one of unicast, multicast, and broadcast.

The fourth QoS information includes some or all content in information about the fourth QoS flow.

For example, the fourth QoS information may include the fourth QoS parameter and the fourth communication type information that are associated with the fourth QoS flow.

For another example, the fourth QoS information may include the fourth PFI, the fourth QoS parameter, and the fourth sidelink information.

For still another example, the fourth QoS information may include the fourth PFI and the fourth QoS parameter. Optionally, the fourth QoS information may further include the fourth communication type information.

In another manner, the fourth QoS information may include information about at least one QoS flow. The information about the at least one QoS flow does not include the information about the fourth QoS flow. The fourth QoS information includes information that is about a QoS flow and that is previously sent by the terminal device to the network device, and the information about the fourth QoS flow is included in QoS information previously sent by the terminal device to the network device. In this manner, the fourth QoS flow, of the terminal device, that does not meet the QoS requirement may be implicitly indicated.

Optionally, the fourth QoS information may be sent by using an SUI message or another RRC message.

In a current technology, when to establish an SDAP entity is not clearly defined for V2X communication. As a result, a terminal device does not know when to establish an SDAP entity, and communication may fail.

This application further provides an SDAP entity establishment method. The method includes:

When one or more of the following conditions (1) to (11) are met, a terminal device establishes a first SDAP entity associated with first sidelink information, where the first sidelink information is used to identify a first sidelink.

(1) An upper layer of the terminal device indicates, to an access layer of the terminal device for the first time, a PFI and a QoS parameter that are associated with the first sidelink information.

(2) The upper layer delivers, to the access layer for the first time, a data packet associated with the first sidelink information.

(3) The terminal device receives, through the first sidelink for the first time, a data packet associated with the first sidelink information.

(4) The terminal device sends a sidelink communication request message associated with the first sidelink information.

(5) The terminal device receives a sidelink communication accept message associated with the first sidelink information.

(6) The terminal device reports, for the first time, QoS information associated with the first sidelink information or carrier information associated with the first sidelink information.

(7) The terminal device receives, for the first time, SLRB configuration information sent by a network device for the first sidelink information.

(8) The terminal device receives, for the first time, SLRB configuration information sent by another terminal device for the first sidelink information.

(9) The access layer receives, from the upper layer, indication information that indicates to establish the first SDAP entity.

(10) For a QoS flow with data, an SLRB to which the QoS flow is mapped is established, and an SDAP entity associated with the QoS flow does not exist yet.

(11) The terminal device is configured by the upper layer to perform sidelink communication.

It should be understood that the terminal device may establish the first SDAP entity when a specific one or any one of the foregoing conditions is met, or when a plurality of the foregoing conditions are met.

It should be understood that the data packet in the foregoing conditions may be alternatively replaced with a PC5 QoS flow.

For example, the condition (1) may be further understood as follows: The upper layer indicates, to the access layer, the PFI and the QoS parameter that are associated with the first sidelink information, and a corresponding SDAP entity has not been established for a QoS flow associated with the PFI and the QoS parameter. It should be understood that the indicating, by the upper layer to the access layer, the PFI and the QoS parameter that are associated with the first sidelink information means that the upper layer initiates the QoS flow associated with the PFI and the QoS parameter to the access layer.

For example, the condition (2) may be further understood as follows: The upper layer delivers a data packet associated with the first sidelink information to the access layer, and a corresponding SDAP entity has not been established for the data packet. It should be understood that the delivering, by the upper layer, a data packet associated with the first sidelink information to the access layer means that the upper layer initiates a QoS flow associated with the first sidelink information to the access layer.

The condition (3) means that the terminal device receives, on a PC5 interface for the first time, a data packet associated with the first sidelink information.

The sidelink communication request message in the condition (4) may be Direct_communication_request.

The sidelink communication accept message in the condition (5) may be Direct_communication_accept.

The QoS information associated with the first sidelink information in the condition (6) may correspond to the first QoS information in the foregoing descriptions.

The SLRB configuration information for the first sidelink information in the conditions (7) and (8) is the first SLRB configuration information in the foregoing descriptions.

For example, the QoS flow with data in the condition (10) may be understood as a QoS flow with data to be sent or a QoS flow with data to be received. It should be understood that the QoS flow with data may be configured by the upper layer, or configured by a peer end of the terminal device by using a PC5-RRC reconfiguration message, or configured by the network device by using RRC dedicated signaling or a SIB broadcast message or through pre-configuration, or the like. It should be understood that, that an SLRB to which the QoS flow is mapped is established may also be understood as that the QoS flow meets a related condition for establishing the SLRB.

According to the SDAP entity establishment method provided in this application, a prerequisite for establishing an SDAP entity is specified, so that the terminal device may establish an SDAP entity on a proper occasion, thereby facilitating sidelink transmission.

This application further provides an SDAP entity release method. The method includes:

When one or more of the following conditions are met, a terminal device releases a first SDAP entity associated with first sidelink information, where the first sidelink information is used to identify a first sidelink.

(1) No PFI or QoS parameter associated with the first sidelink information exists.

(2) An upper layer no longer delivers, to an access layer, a data packet associated with the first sidelink information.

(3) The terminal device no longer receives, through the first sidelink, a data packet associated with the first sidelink information.

(4) All SLRBs for the first sidelink information have been released.

It should be understood that the terminal device may release the first SDAP entity when a specific one or any one of the foregoing conditions is met, or when a plurality of the foregoing conditions are met.

The condition (1) means that the first sidelink information is no longer associated with any PFI or QoS information. It should be understood that the first sidelink information is no longer associated with any PFI or QoS information when the first sidelink is released.

For the condition (2), optionally, the first SDAP entity may be released if the access layer does not receive, within first preset duration, a data packet that is associated with the first sidelink information and that is delivered by the upper layer.

For example, a timer may be configured, and duration of the timer is set to the first preset duration. The first SDAP entity is released when the timer expires and the access layer does not receive a data packet that is associated with the first sidelink information and that is delivered by the upper layer; or the timer is initialized to 0 if the access layer receives, before the timer expires, a data packet that is associated with the first sidelink information and that is delivered by the upper layer.

For example, the timer may be configured by using RRC, a MAC CE, or a SIB, or pre-configured. Optionally, different sidelink information may be associated with different timers, that is, different duration may be set for timers associated with different sidelink information.

For the condition (3), optionally, the terminal device may release the first SDAP entity if the terminal device does not receive, through a sidelink within second preset duration, a data packet associated with the first sidelink information.

For example, a timer may be configured, and duration of the timer is set to the second preset duration. The first SDAP entity is released when the timer expires and the terminal device does not receive, through a sidelink, a data packet associated with the first sidelink information; or the timer is initialized to 0 if the terminal device does not receive, through a sidelink before the timer expires, a data packet associated with the first sidelink information. For example, for a manner of configuring the timer, refer to the manner of configuring the timer in the foregoing descriptions. Details are not described herein again.

The first preset duration and the second preset duration may be the same or different. This is not limited in this application.

The condition (4) may be understood as that all SLRBs established for the first sidelink are released, and similarly, may also be understood as that all SLRBs associated with the first SDAP entity are released.

Optionally, when the first SDAP entity is released, the access layer sends information to the upper layer to indicate that the first SDAP entity is released.

According to the SDAP entity release method provided in this application, a prerequisite for releasing an SDAP entity is specified, so that the terminal device may release an SDAP entity on a proper occasion, thereby saving resources.

This application further provides an SDAP entity establishment method. The method includes:

When one or more of the following conditions (1) to (10) are met, a terminal device establishes a first SDAP entity, where one terminal device has only one SDAP entity.

(1) An upper layer of the terminal device indicates, to an access layer of the terminal device for the first time, a PFI and a QoS parameter that are associated with sidelink information.

(2) The upper layer of the terminal device indicates an association relationship with a PFI and a QoS parameter to the access layer of the terminal device for the first time.

(3) The upper layer delivers a data packet to the access layer for the first time.

(4) The terminal device receives a data packet through a sidelink for the first time.

(5) The terminal device sends a sidelink communication request message for the first time.

(6) The terminal device receives a sidelink communication accept message for the first time.

(7) The terminal device reports, for the first time, QoS information associated with the sidelink information or carrier information associated with the sidelink information.

(8) The terminal device receives, for the first time, SLRB configuration information sent by a network device.

(9) The terminal device receives, for the first time, SLRB configuration information sent by another terminal device.

(10) The access layer receives, from the upper layer, indication information that indicates to establish the first SDAP entity.

It should be understood that the terminal device may establish the first SDAP entity when a specific one or any one of the foregoing conditions is met, or when a plurality of the foregoing conditions are met.

The condition (4) means that the terminal device receives a data packet on a PC5 interface for the first time.

The sidelink communication request message in the condition (5) may be Direct_communication_request.

The sidelink communication accept message in the condition (6) may be Direct_communication_accept.

The QoS information associated with the sidelink information in the condition (7) may correspond to the first QoS information in the foregoing descriptions.

The SLRB configuration information in the condition (8) is the first SLRB configuration information in the foregoing descriptions.

According to the SDAP entity establishment method provided in this application, a prerequisite for establishing an SDAP entity is specified, so that the terminal device may establish an SDAP entity on a proper occasion, thereby facilitating sidelink transmission.

This application further provides an SDAP entity release method. The method includes:

When one or more of the following conditions are met, a terminal device releases a first SDAP entity, where one terminal device has only one SDAP entity.

(1) No sidelink information has an associated PFI or QoS parameter.

(2) No association relationship with a PFI or a QoS parameter exists.

(3) An upper layer no longer delivers a data packet to an access layer.

(4) The terminal device no longer receives a data packet through a sidelink.

(5) All SLRBs have been released.

It should be understood that the terminal device may release the first SDAP entity when a specific one or any one of the foregoing conditions is met, or when a plurality of the foregoing conditions are met.

The condition (1) means that any sidelink information is no longer associated with any PFI or QoS parameter.

For the condition (3), optionally, the first SDAP entity may be released if the access layer does not receive, within first preset duration, a data packet delivered by the upper layer.

For example, a timer may be configured, and duration of the timer is set to the first preset duration. The first SDAP entity is released when the timer expires and the access layer does not receive a data packet delivered by the upper layer; or the timer is initialized to 0 if the access layer receives, before the timer expires, a data packet delivered by the upper layer.

For example, the timer may be configured by using RRC, a MAC CE, or a SIB, or pre-configured.

For the condition (4), optionally, the terminal device may release the first SDAP entity if the terminal device does not receive a data packet through a sidelink within second preset duration.

For example, a timer may be configured, and duration of the timer is set to the second preset duration. The first SDAP entity is released when the timer expires and the terminal device does not receive a data packet through a sidelink; or the timer is initialized to 0 if the terminal device does not receive a data packet through a sidelink before the timer expires. For example, for a manner of configuring the timer, refer to the manner of configuring the timer in the foregoing descriptions. Details are not described herein again.

The first preset duration and the second preset duration may be the same or different. This is not limited in this application.

The condition (5) may be understood as that the terminal device has released all SLRBs.

Optionally, the SLRB related to the content of establishing the first SDAP entity and releasing the first SDAP entity may be an SL-DRB.

According to the SDAP entity release method provided in this application, a prerequisite for releasing an SDAP entity is specified, so that the terminal device may release an SDAP entity on a proper occasion, thereby saving resources.

This application further provides an SLRB establishment method. Details are described below.

FIG. 5 shows an SLRB establishment method according to this application. The method 500 may include S510 and S520. The steps are described below.

S510. A first terminal device determines whether one or more of the following is met:

(1) A first QoS flow has data.

(2) The first terminal device is configured by an upper layer to perform sidelink communication.

(3) The first terminal device receives first configuration information sent by a network device, where the first configuration information indicates that the first QoS flow is mapped to a first SLRB, and the first SLRB has not been established.

(4) The first terminal device receives a reconfiguration complete message sent by a second terminal device.

(5) The first terminal device receives second configuration information sent by the second terminal device, where the second configuration information indicates that the first QoS flow is mapped to the first SLRB, and the first SLRB has not been established.

That the first QoS flow is mapped to the first SLRB means that the first QoS flow is associated with the first SLRB.

For example, the first SLRB is associated with first sidelink information, and the first QoS flow is associated with the first sidelink information. That the first QoS flow is associated with the first sidelink information may be understood as that the first QoS flow is a QoS flow for the first sidelink information. The first sidelink information includes one or more of first communication type information, a first source identifier, and a first destination identifier, and the first communication type information is one of unicast, multicast, and broadcast.

It should be understood that, when the first SLRB is associated with a unicast connection, the second terminal device is a peer terminal device of the first terminal device in the unicast connection.

It should be further understood that the first terminal device herein is the terminal device in the foregoing descriptions. In addition, the SLRB in the method is mainly an SL-DRB.

S520. When one or more of the foregoing is met, the first terminal device establishes the first SLRB.

According to the SLRB establishment method provided in this application, a condition for triggering a terminal device to establish an SLRB is clearly defined, so that the terminal device may establish the SLRB when the condition is met, to perform sidelink transmission.

The foregoing five conditions are separately described below.

Optionally, that the first QoS flow has a data in the condition (1) may be understood as that the first QoS flow has data to be sent or the first QoS flow has data to be received. For example, the upper layer of the first terminal device may indicate (in other words, "configure") that the first QoS flow has data to be sent or received. For example, the second terminal device may indicate that the first QoS flow has data to be sent or received. For example, the second terminal device may indicate, by using a PC5-RRC reconfiguration message, that the first QoS flow has data to be sent or received.

For example, the indicating, by the upper layer, that the first QoS flow has data to be sent may be specifically as follows: The upper layer of the first terminal device initiates the first QoS flow. The initiating, by the upper layer, the first QoS flow may be initiating, by the upper layer to an access layer of the first terminal device, a first PFI and a first QoS parameter that are associated with the first QoS flow, or may be delivering, by the upper layer to the access layer, a data packet corresponding to the first QoS flow. In other words, if the access layer receives the first PFI and the first QoS parameter, it is determined that the upper layer has initiated the first QoS flow; or if the access layer receives the first QoS flow or the data packet corresponding to the first QoS flow, it is determined that the upper layer has initiated the first QoS flow.

For example, the indicating, by the second terminal device, that the first QoS flow has data to be received may be specifically as follows: The second terminal device initiates the first QoS flow. For example, the initiating, by the second terminal device, the first QoS flow may be understood as follows: The second terminal device sends, to the first terminal device, the first PFI and the first QoS parameter that are associated with the first QoS flow. In other words, if the first terminal device receives the first PFI and the first QoS parameter, it is determined that the second terminal device has initiated the first QoS flow. Further, the second terminal device may further send a mapping relationship between the first QoS flow and the first SLRB to the first terminal device.

It should be noted that, in the method, the first PFI may be alternatively replaced with other information used to identify the first QoS flow. For example, the first PFI may be an index of the first QoS flow.

Optionally, the first configuration information in the condition (3) may be carried in an RRC reconfiguration message or a SIB system broadcast message, or the first configuration information is pre-configured information. The pre-configured information may be sent by a V2X-control function (control function) network element by using the network device. For example, the V2X-control function network element may be a policy control function (policy control function, PCF) network element.

Optionally, the reconfiguration complete message in the condition (4) may be a PC5-RRC reconfiguration complete message.

For example, the reconfiguration complete message may be a feedback message of the second terminal device for a corresponding SLRB establishment request message of the first terminal device for requesting to establish the first SLRB. In other words, the first terminal device sends the SLRB establishment request message to the second terminal device before the second terminal device sends the reconfiguration complete message to the first terminal device. After receiving the SLRB establishment request message, the second terminal device sends the reconfiguration complete message to the first terminal device. The SLRB establishment request message is sent by the first terminal device when the first terminal device needs to establish the first SLRB. The SLRB establishment request message may be used to request the second terminal device to establish a second SLRB, and the second SLRB is associated with the first SLRB. It should be understood that, that the first SLRB is associated with the second SLRB means that the first SLRB and the second SLRB are associated with same sidelink information, and some configuration parameters (parameters related to both sending and receiving) of the first SLRB and the second SLRB are the same.

It should be understood that the parameters related to both sending and receiving are parameters related to both sending and receiving of an SLRB. For example, the parameters may be an RLC mode, an RLC SN length, a PDCP SN length, a mapping relationship from a QoS flow to an SLRB, an SLRB ID or an SLRB index, a logical channel ID or a logical channel index, and a PDCP header compression parameter.

For example, the first terminal device sends the SLRB establishment request message to the second terminal device only when the first QoS flow is associated with the unicast connection, that is, when the first SLRB is associated with the unicast connection.

For example, the SLRB establishment request message may be a PC5-RRC reconfiguration message.

For example, the SLRB establishment request message includes configuration information related to the second SLRB.

Optionally, the second configuration information in the condition (5) may be carried in a PC5-RRC reconfiguration message.

It should be understood that both the first configuration information and the second configuration information may be SLRB configuration information associated with the first QoS flow. The SLRB configuration information associated with the first QoS flow is the first SLRB configuration information in the foregoing descriptions.

It should be understood that the first configuration information in the condition (2) or the second configuration information in the condition (5) is SLRB configuration information associated with some parameters related to the first QoS flow. For details, refer to the foregoing descriptions of the parameters. Details are not described herein again.

Optionally, the SLRB configuration information may be carried in one or more of the following information elements (information element, IE): DRB-ToAddModlist, DRB-ToAddMod, RLC-BearerToAddModList, and RLC-BearerConfig.

It should be understood that, for the DRB-ToAddModlist, the DRB-ToAddMod, the RLC-BearerToAddModList, the RLC-BearerConfig, and the like, reference may be made to the prior art. Details are not described herein.

For example, if some SL-DRB IDs or SL-DRB indexes in the DRB-ToAddModList are not included in DRB-ToAddModList in SLRB configuration information previously received by the first terminal device, it is determined that SL-DRBs corresponding to the SL-DRB IDs or the SL-DRB indexes are SL-DRBs to be configured (in other words, "added").

Optionally, that the first SLRB has not been established in the condition (3) may be indicated by using the first configuration information, or may be determined by the first terminal device. Similarly, that the first SLRB has not been established in the condition (5) may be indicated by using the second configuration information, or may be determined by the first terminal device. Optionally, the establishing the first SLRB includes one or more of the following: establishing a first SDAP entity associated with the first QoS flow or the first SLRB, configuring the first SDAP entity based on SDAP configuration information associated with the first SLRB, establishing a first PDCP entity associated with the first SLRB, establishing a first RLC entity associated with the first SLRB, configuring a first logical channel associated with the first SLRB, and associating the first PDCP entity with the first RLC entity (the first logical channel).

Optionally, if no SDAP entity associated with the first QoS flow exists, the first SDAP entity is established.

Optionally, the condition (4) needs to be considered only when the first sidelink associated with the first SLRB is a unicast link. In other words, the condition (4) needs to be considered only when the first terminal device sends the PC5-RRC reconfiguration message. It should be understood that the first terminal device may establish the first SLRB when a specific one or any one of the foregoing conditions is met, or when a plurality of the foregoing conditions are met. For example, when the conditions (1), (2), (3), and (4) are met, the first SLRB may be established. For another example, when the conditions (1), (2), and (5) are met, the first SLRB is established.

Optionally, the first SLRB is not a default SL-DRB.

Optionally, the method may further include: After establishing the first SLRB, the first terminal device releases the first SLRB if the first terminal device receives an establishment failure response message sent by the second terminal device. The establishment failure response message is used to indicate that the second terminal device fails to establish the second SLRB.

It should be understood that the establishment failure response message sent by the second terminal device may be a PC5-RRC reconfiguration failure message.

This application further provides another SLRB establishment method. The method includes: A first terminal device establishes a first SLRB based on obtained SLRB configuration information.

It should be understood that the first terminal device herein is the terminal device in the foregoing descriptions. In addition, the SLRB in the method is mainly an SL-DRB.

Optionally, the first terminal device may establish an SLRB for each piece of sidelink information based on the obtained SLRB configuration information.

Each piece of sidelink information is sidelink information currently existing on the first terminal device, for example, may include first sidelink information.

In a manner, the obtaining, by the first terminal device, the SLRB configuration information includes:

when the first terminal device is in an RRC connected state, the first terminal device obtains the SLRB configuration information by using RRC signaling; and/or when the first terminal device is in an RRC idle state or inactive state, the first terminal device obtains the SLRB configuration information by using a SIB; and/or when the first terminal device is in an OOC state, the first terminal device obtains the SLRB configuration information through pre-configuration.

For another example, when the first terminal device performs sidelink communication with a peer terminal device, the first terminal device obtains, by using a PC5-RRC reconfiguration message, SLRB configuration information associated with a first QoS flow.

It should be understood that, in the RRC connected state, the first terminal device may alternatively obtain the SLRB configuration information by using a SIB or through pre-configuration; and in the RRC idle state or inactive state, the first terminal device may alternatively obtain the SLRB configuration information through pre-configuration.

In another manner, the obtaining, by the first terminal device, the SLRB configuration information includes: The first terminal device receives the SLRB configuration information sent by a second terminal device.

Specifically, when the first terminal device performs sidelink communication with the second terminal device, the second terminal device may send the SLRB configuration information to the first terminal device by using a PC5-RRC reconfiguration message.

It should be understood that the second terminal device is a peer terminal device of the first terminal device in a unicast connection when the SLRB configuration information is associated with the unicast connection.

Optionally, the SLRB configuration information may be carried in one or more of the following IEs: DRB-ToAddModlist, DRB-ToAddMod, RLC-BearerToAddModList, and RLC-BearerConfig.

For example, if some SL-DRB IDs or SL-DRB indexes in the DRB-ToAddModList are not included in DRB-ToAddModList in SLRB configuration information previously received by the first terminal device, it is determined that SL-DRBs corresponding to the SL-DRB IDs or the SL-DRB indexes are SL-DRBs to be configured (in other words, "added").

Optionally, if the SLRB configuration information includes first SDAP entity configuration information, a first SDAP entity is configured based on the first SDAP entity configuration information.

Optionally, if the SLRB configuration information includes first PDCP entity configuration information, a first PDCP entity is established based on the first PDCP entity configuration information.

Optionally, if the SLRB configuration information includes first RLC entity configuration information, a first RLC entity is established based on the first RLC entity configuration information.

Optionally, if the SLRB configuration information includes first logical channel configuration information, a first logical channel is configured based on the first logical channel configuration information.

Optionally, the method may further include: The first terminal device sends an SLRB establishment request message to a target terminal device. The first terminal device receives an SLRB establishment response message sent by the target terminal device.

The target terminal device is a peer end of a first sidelink corresponding to the first sidelink information. The SLRB establishment request message is used to request the target terminal device to establish a second SLRB, and the second SLRB is associated with the first SLRB. It should be understood that, that the first SLRB is associated with the second SLRB means that the first SLRB and the second SLRB are associated with same sidelink information, and some configuration parameters (parameters related to both sending and receiving) of the first SLRB and the second SLRB are the same.

For example, the SLRB establishment request message and the SLRB establishment response message each are sent by using a PC5-RRC message. It should be understood that the PC5-RRC message may be a PC5-RRC reconfiguration message.

For example, the SLRB establishment request message includes configuration information related to the second SLRB.

Optionally, the first terminal device sends the SLRB establishment request message to the target terminal device only when communication type information associated with the first sidelink is unicast.

In an implementation, the first terminal device may send the SLRB establishment request message when or after establishing the first SLRB.

In another implementation, the first terminal device may establish the first SLRB when or after receiving the SLRB establishment response message.

Optionally, the first terminal device establishes the first SLRB only when or after receiving an SLRB establishment success response message.

Optionally, the first terminal device releases the first SLRB after establishing the first SLRB and receiving an establishment failure response message sent by the target terminal device.

Optionally, when the first terminal device updates an L2 ID, for example, updates a first source identifier in the first sidelink information to a second source identifier, the terminal device associates, with the second source identifier, an LCH originally associated with the first sidelink information.

This application further provides an SLRB establishment method. The method includes:

If a target terminal device receives SLRB configuration information associated with first sidelink information, and has not established an SLRB for the first sidelink information and a first logical channel, the target terminal device establishes a second SLRB based on the SLRB configuration information associated with the first sidelink information.

Optionally, the SLRB configuration information includes information about the first logical channel.

Optionally, the target terminal device establishes the second SLRB based on the SLRB configuration information associated with the first sidelink information only when the target terminal device receives the SLRB configuration information associated with the first sidelink information, has not established an SLRB for the first sidelink information and the first logical channel, and has sent a PC5-RRC reconfiguration complete message.

It should be understood that the SLRB in the method is an SL-DRB.

This application further provides an SLRB establishment method. The method includes:

When an upper layer has established a unicast connection identified by a first source identifier and/or a first destination identifier, a terminal device establishes, according to a pre-configuration in a protocol, an SL-DRB associated with the unicast connection, where the SL-DRB is used to send or receive a PC5-S message.

This application further provides an SLRB reconfiguration method. Details are described below.

FIG. 6 shows an SLRB reconfiguration method according to this application. The method may include S610 and S620. The steps are described below.

S610. A first terminal device determines whether one or more of the following is met:

(1) A first QoS flow has data.

(2) The first terminal device is configured by an upper layer to perform sidelink communication.

(3) The first terminal device receives first configuration information sent by a network device, where the first configuration information indicates that the first QoS flow is mapped to a first SLRB, and the first SLRB has been established.

(4) The first terminal device receives a corresponding PC5-RRC reconfiguration complete message.

(5) The first terminal device receives second configuration information sent by a second terminal device, where the second configuration information indicates that the first QoS flow is mapped to the first SLRB, and the first SLRB has been established.

That the first QoS flow is mapped to the first SLRB means that the first QoS flow is associated with the first SLRB.

For example, the first SLRB is associated with first sidelink information, and the first QoS flow is associated with the first sidelink information. That the first QoS flow is associated with the first sidelink information may be understood as that the first QoS flow is a QoS flow for the first sidelink information. The first sidelink information includes one or more of first communication type information, a first source identifier, and a first destination identifier, and the first communication type information is one of unicast, multicast, and broadcast.

It should be understood that, when the first SLRB is associated with a unicast connection, the second terminal device is a peer terminal device corresponding to the first terminal device in the unicast connection.

It should be further understood that the first terminal device herein is the terminal device in the foregoing descriptions. In addition, the SLRB in the method is mainly an SL-DRB.

S620. When one or more of the foregoing is met, the first terminal device reconfigures the first SLRB.

According to the SLRB reconfiguration method provided in this application, a condition for triggering a terminal device to reconfigure an SLRB is clearly defined, so that the terminal device may reconfigure the SLRB when the condition is met, to perform sidelink transmission.

The foregoing five conditions are separately described below.

Optionally, a meaning of that the first QoS flow has a data in the condition (1) is the same as the meaning of that the first QoS flow has a data in the condition (1) in the method 500. For details, refer to the foregoing descriptions of the condition (1) in the method 500. Details are not described herein again.

Optionally, the first configuration information in the condition (3) may be carried in an RRC reconfiguration message, a SIB system broadcast message, or pre-configured information. The pre-configured information may be sent by a V2X-control function (control function) network element by using the network device. For example, the V2X-control function network element may be a PCF.

Optionally, the reconfiguration complete message in the condition (4) may be a PC5-RRC reconfiguration complete message.

For example, the reconfiguration complete message may be a feedback message of the second terminal device for a corresponding SLRB reconfiguration request message of the first terminal device for requesting to reconfigure the first SLRB. In other words, the first terminal device sends the SLRB reconfiguration request message to the second terminal device before the second terminal device sends the reconfiguration complete message to the first terminal device. After receiving the SLRB reconfiguration request message, the second terminal device sends the reconfiguration complete message to the first terminal device. The SLRB reconfiguration request message is sent by the first terminal device when the first terminal device needs to reconfigure the first SLRB. The SLRB reconfiguration request message may be used to request the second terminal device to reconfigure a second SLRB, and the second SLRB is associated with the first SLRB. It should be understood that, that the first SLRB is associated with the second SLRB means that the first SLRB and the second SLRB are associated with same sidelink information, and some configuration parameters (parameters related to both sending and receiving) of the first SLRB and the second SLRB are the same.

It should be understood that the parameters related to both sending and receiving are parameters related to both sending and receiving of an SLRB. For example, the parameters may be an RLC mode, an RLC SN length, a PDCP SN length, a mapping relationship from a QoS flow to an SLRB, an SLRB ID or an SLRB index, a logical channel ID or a logical channel index, and PDCP header compression.

For example, the first terminal device sends the SLRB reconfiguration request message to the second terminal device only when the first QoS flow is associated with the unicast connection, that is, when the first SLRB is associated with the unicast connection.

For example, the SLRB reconfiguration request message may be a PC5-RRC reconfiguration message.

For example, the SLRB reconfiguration request message may include configuration information related to the second SLRB.

For example, the first terminal device sends the SLRB reconfiguration request message to the second terminal device if a parameter that is related to both sending and receiving and that corresponds to the first SLRB changes.

It should be understood that both the first configuration information and the second configuration information may be SLRB configuration information associated with the first QoS flow. The SLRB configuration information associated with the first QoS flow is the first SLRB configuration information in the foregoing descriptions.

For example, the parameters related to both sending and receiving may be alternatively an SLRB configuration parameter included in the PC5-RRC reconfiguration message.

It should be understood that the first terminal device sends the SLRB reconfiguration request message to the second terminal device only when a parameter that is related to both sending and receiving and that is in the SLRB configuration information associated with the first QoS flow changes, where this may be further understood as that a parameter that is related to both sending and receiving and that is in the SLRB configuration information associated with the first QoS flow is different from a parameter that is related to both sending and receiving and that is currently in the first SLRB associated with the first QoS flow.

Optionally, the SLRB configuration information may be carried in one or more of the following IEs: DRB-ToAddModlist, DRB-ToAddMod, RLC-BearerToAddModList, and RLC-BearerConfig.

It should be understood that, for the DRB-ToAddModlist, the DRB-ToAddMod, the RLC-BearerToAddModList, the RLC-BearerConfig, and the like, reference may be made to the prior art. Details are not described herein.

Optionally, the first terminal device determines, based on whether an SLRB identifier, an SLRB index, an RLC or LCH identifier, or an RLC or LCH index in the SLRB configuration information is included in a currently stored SLRB configuration, whether the SLRB configuration is a reconfiguration.

For example, if some SL-DRB IDs or SL-DRB indexes in the DRB-ToAddModList are included in DRB-ToAddModList in SLRB configuration information previously received by the first terminal device, it is determined that SL-DRBs corresponding to the SL-DRB IDs are SL-DRBs to be reconfigured (in other words, "modified").

Optionally, the first terminal device determines, based on whether an SLRB corresponding to the SLRB configuration information has been established, whether the SLRB configuration information is reconfiguration information. For example, if the SLRB corresponding to the SLRB configuration information has been established, the SLRB configuration information is reconfiguration information.

Optionally, the second configuration information in the condition (5) may be carried in a PC5-RRC reconfiguration message.

Optionally, that the first SLRB has been established in the condition (3) may be indicated by using the first configuration information, or may be determined by the first terminal device. Similarly, that the first SLRB has been established in the condition (5) may be indicated by using the second configuration information, or may be determined by the first terminal device. Optionally, the reconfiguring the first SLRB includes one or more of the following: reconfiguring an SDAP entity associated with the first SLRB, reconfiguring a first PDCP entity associated with the first SLRB, reconfiguring a first RLC entity associated with the first SLRB, and reconfiguring a first logical channel associated with the first SLRB.

Optionally, if an SDAP configuration associated with the first SLRB is different from a currently used parameter, a first SDAP entity is reconfigured.

Optionally, if a PDCP configuration associated with the first SLRB is different from a currently used parameter, the first PDCP entity is reconfigured.

Optionally, if an RLC configuration associated with the first SLRB is different from a currently used parameter, the first RLC entity is reconfigured.

Optionally, if a logical channel configuration associated with the first SLRB is different from a currently used parameter, the first logical channel is reconfigured.

Optionally, the condition (4) needs to be considered only when the first SLRB is associated with the unicast connection. In other words, the condition (4) needs to be considered only when the first terminal device sends the PC5-RRC reconfiguration message. For example, when one or more of the foregoing plurality of conditions are met, the first SLRB may be reconfigured. For example, when the conditions (1), (2), (3), and (4) are met, the first SLRB is reconfigured; or when the conditions (1), (2), and (5) are met, the first SLRB is reconfigured.

Optionally, the foregoing descriptions of the SLRB reconfiguration are also applicable to SLRB re-establishment. A difference lies in that an SLRB configuration associated with the first QoS flow includes re-establishment indication information. For example, reestablishPDCP is included in the SLRB configuration information associated with the first QoS flow to indicate re-establishment.

Optionally, the method may further include: After reconfiguring the first SLRB, if the first terminal device receives a reconfiguration failure response message sent by the second terminal device, the first terminal device releases the first SLRB or restores the first SLRB to a corresponding first SLRB that exists before the reconfiguration. The reconfiguration failure response message is used to indicate that the second terminal device fails to reconfigure the second SLRB.

It should be understood that the reconfiguration failure response message sent by the second terminal device may be carried in a PC5-RRC reconfiguration failure message.

This application further provides an SLRB reconfiguration method. The method includes:

If a target terminal device receives an SLRB configuration information associated with first sidelink information, and has established an SLRB for the first sidelink information and a first logical channel, the target terminal device reconfigures a second SLRB based on the SLRB configuration information associated with the first sidelink information. Optionally, the SLRB configuration information includes information about the first logical channel.

Optionally, the target terminal device reconfigures the second SLRB based on the SLRB configuration information associated with the first sidelink information only when the target terminal device receives the SLRB configuration information associated with the first sidelink information, and has established the SLRB for the first sidelink information and the first logical channel, and a parameter that is related to both sending and receiving and that is in an SLRB reconfiguration information associated with the first sidelink information is different from a parameter that is related to both sending and receiving and that is currently in the second SLRB.

Optionally, the target terminal device reconfigures the second SLRB based on the SLRB configuration information associated with the first sidelink information only when the target terminal device receives the SLRB configuration information associated with the first sidelink information, and has established the SLRB for the first sidelink information and the first logical channel, a parameter that is related to both sending and receiving, a parameter that is in an SLRB reconfiguration information associated with the first sidelink information is different from a parameter that is related to both sending and receiving and that is currently in the second SLRB, and the target terminal device has sent a PC5-RRC reconfiguration complete message. It should be understood that the SLRB in the method is an SL-DRB.

This application further provides an SLRB release method. The method includes: When one or more of the following is met, a first terminal device releases a first SLRB:

(1) The first terminal device is configured by an upper layer to perform sidelink communication.

(2) The first terminal device receives first SLRB release information sent by a network device.

(3) No QoS flow with data is mapped to the first SLRB.

(4) The first terminal device receives a reconfiguration complete message sent by a second terminal device.

(5) The first terminal device receives first SLRB release information sent by the second terminal device.

(6) The first SLRB has no data to be sent or received.

The first SLRB is associated with first sidelink information. The first sidelink information includes one or more of first communication type information, a first source identifier, and a first destination identifier, and the first communication type information is one of unicast, multicast, and broadcast.

It should be understood that, when the first SLRB is associated with a unicast connection, the second terminal device is a peer terminal device of the first terminal device in the unicast connection.

It should be further understood that the first terminal device herein is the terminal device in the foregoing descriptions. In addition, the SLRB in the method is mainly an SL-DRB.

According to the SLRB release method provided in this application, a terminal device may release an SLRB in a specific condition, thereby improving resource utilization.

It should be understood that, that the first terminal device receives the first SLRB release information sent by the network device in the condition (2) may be further understood as that an SLRB ID or an SLRB index corresponding to the first SLRB is included in an IE in sl-RadioBearer-ToReleaseList sent by the network device. For example, the sl-RadioBearerToReleaseList may be included in an RRC reconfiguration message.

It should be understood that, that no QoS flow with data is mapped to the first SLRB in the condition (3) may be further understood as that no QoS flow with data to be sent or received is mapped to the first SLRB, or may be further understood as that all QoS flows with data that are mapped to the first SLRB are released.

Optionally, that no QoS flow with data is mapped to the first SLRB may be indicated by using an RRC dedicated signaling message configuration (or indication, or the like), a SIB system message configuration, a pre-configuration, an upper-layer configuration, a PC5-RRC reconfiguration message, or the like.

Optionally, the reconfiguration complete message in the condition (4) may be a PC5-RRC reconfiguration complete message. For example, the PC5-RRC reconfiguration complete message is a feedback message of the second terminal device for a corresponding SLRB release request message of the first terminal device for requesting to release the first SLRB. For example, the first terminal device sends the SLRB release request message when the first terminal device needs to release the first SLRB.

It should be understood that, that the first terminal device receives the first SLRB release information sent by the second terminal device in the condition (5) may be further understood as that an SLRB ID or an SLRB index corresponding to the first SLRB is included in an IE in slrb-ConfigToReleaseList sent by the second terminal device. For example, the slrb-ConfigToReleaseList may be included in a PC5-RRC reconfiguration message.

It should be understood that, that the first SLRB has no data to be sent or received in the condition (6) may be further understood as that a buffer corresponding to the first SLRB has no data to be sent or received.

Optionally, the first SLRB release information in the condition (2) or (5) may be carried in an IE such as DRB-ToReleaselist or RLC-BearerToRleaseList. For example, the DRB-ToReleaselist is used to indicate information about an SL-DRB ID or an SL-DRB index for release. For example, for the information that is about the SL-DRB ID or the SL-DRB index for release and that is indicated by the DRB-ToReleaselist, SLRBs that correspond to all sidelink information and that are associated with the SLR-DRB ID or the SL-DRB index are released.

Optionally, if the first SLRB release information includes SLDRB-ToReleaselist, a PDCP entity is released based on the SLDRB-ToReleaselist.

Optionally, if the first SLRB release information includes SLRLC-BearerToRleaseList, an RLC entity and an LCH are released based on the SL RLC-BearerToRleaseList.

Optionally, when the first terminal device encounters a state transition (an RRC state or a coverage state changes), and an SLRB configuration corresponding to the first SLRB no longer exists (expires), it may be understood that the first terminal device has received the first SLRB release information sent by the network device.

Optionally, the condition (4) needs to be considered only when the first sidelink associated with the first SLRB is a unicast link. In other words, the condition (4) needs to be considered only when the first terminal device sends the reconfiguration message.

It should be understood that a corresponding condition in the plurality of conditions needs to be considered only when determining needs to be performed on the condition.

For example, the condition (2) and the condition (5) indicate that both the condition (2) and the condition (5) need to be considered only when the first SLRB is a bidirectional SLRB (that is, the first SLRB is used for both sending data and receiving data). It should be further understood that the first SLRB may be released when one or more of the foregoing plurality of conditions are met. Optionally, when releasing the first SLRB, the first terminal device releases a PDCP entity associated with the first SLRB.

Optionally, when releasing the first SLRB, the first terminal device indicates, to an associated first SDAP entity, the release of the first SLRB. For example, when the first SDAP entity associated with the first SLRB is configured to perform sidelink communication, the release of the first SLRB is indicated to the first SDAP entity.

Optionally, when releasing the first SLRB, the first terminal device releases an RLC entity associated with the first SLRB.

Optionally, when releasing the first SLRB, the first terminal device releases a logical channel associated with the first SLRB. Optionally, the first SDAP entity is released when all SLRBs associated with the first SDAP entity are released.

Optionally, the method may further include: The first terminal device sends SLRB release indication information to the network device, where the SLRB release indication information is used to indicate that the first terminal device has released or is to release the first SLRB.

Therefore, the network device may learn, based on the SLRB release indication information, that the first terminal device has released or is to release the first SLRB. Further, the network device may release configuration information related to the first SLRB, thereby improving resource utilization.

For example, the SLRB release indication information may include the first sidelink information and/or an ID of the first SLRB.

Optionally, the first terminal device sends the SLRB release indication information to the network device only when all SLRBs associated with the SLRB ID corresponding to the first SLRB are released in all sidelink information.

For example, the SLRB release indication information may include the ID of the first SLRB.

Optionally, the first terminal device sends the SLRB release request message to the second terminal device when the first terminal device needs to release the first SLRB. It should be understood that the SLRB release request message may be a PC5-RRC reconfiguration message. It should be understood that the first terminal device triggers a PC5-RRC reconfiguration message procedure when the first terminal device needs to release the first SLRB.

Optionally, the first terminal device may send the SLRB release request message to the second terminal device after releasing the first SLRB.

Alternatively, the first terminal device may first send the SLRB release request message to the second terminal device, and then release the first SLRB when or after receiving an SLRB release response message sent by the second terminal device. Optionally, the first terminal device releases the first SLRB only when or after receiving an SLRB release success response message.

Optionally, if the first terminal device has released the first SLRB and received a release failure response message sent by the second terminal device, the first terminal device restores the first SLRB to a corresponding first SLRB that exists before the release.

It should be understood that the SLRB release success response message or the SLRB release failure response message may be a PC5-RRC reconfiguration complete message or a PC5-RRC reconfiguration failure message.

This application further provides an SLRB release method. The method includes: If a first terminal device obtains release indication information for an SLRB configuration, the first terminal device releases, based on the release indication information for the SLRB configuration, SLRBs corresponding to all sidelink information.

It should be understood that the SLRB configuration herein may correspond to the SLRB configuration information in the foregoing descriptions. For example, the SLRB configuration may correspond to the SLRB configuration information that includes the SLRB configuration information associated with the first QoS flow and that is described in the method 200. In addition, the SLRB herein is mainly an SL-DRB. The first terminal device may correspond to the first terminal device in the foregoing descriptions.

According to the SLRB release method provided in this application, a terminal device may release an SLRB in a specific condition, thereby improving resource utilization.

Optionally, the obtaining, by the first terminal device, the release indication information for the SLRB configuration that is sent by a network device includes:

when the first terminal device is in an RRC connected state, the first terminal device obtains the release indication information for the SLRB configuration by using RRC signaling; and/or when the first terminal device is in an RRC idle state or inactive state, the first terminal device obtains the release indication information for the SLRB configuration by using a SIB; and/or when the first terminal device is in an OOC state, the first terminal device obtains the release indication information for the SLRB configuration through pre-configuration.

For another example, when the first terminal device performs sidelink communication with a peer terminal device, the first terminal device obtains the release indication information for the SLRB configuration by using a PC5-RRC reconfiguration message.

It should be understood that, when the first terminal device is in the RRC connected state, the first terminal device may alternatively obtain the release indication information for the SLRB configuration by using a SIB or through pre-configuration; and when the first terminal device is in the RRC idle state or inactive state, the first terminal device may alternatively obtain the release indication information for the SLRB configuration through pre-configuration.

Optionally, the release indication information for the SLRB configuration is carried in an IE such as DRB-ToReleaselist or RLC-BearerToRleaseList. For example, the DRB-ToReleaselist is used to indicate information about an SL-DRB ID or an SL-DRB index for release. For example, for the information that is about the SL-DRB ID or the SL-DRB index for release and that is indicated by the DRB-ToReleaselist, SLRBs that correspond to all sidelink information and that are associated with the SLR-DRB ID or the SL-DRB index are released.

Optionally, if the release indication information for the SLRB configuration includes SLDRB-ToReleaselist, a PDCP entity is released based on the SLDRB-ToReleaselist.

Optionally, if an SLRB release indication includes SLRLC-BearerToRleaseList, an RLC entity and an LCH are released based on the SL RLC-BearerToRleaseList.

Optionally, the method may further include: The first terminal device sends an SLRB release request message to a target terminal device when or after releasing a first SLRB; or the first terminal device may send an SLRB release request message to the target terminal device after releasing an SLRB. The SLRB release request message is used to request the target terminal device to release a second SLRB, and the second SLRB is associated with the first SLRB. It should be understood that, that the first SLRB is associated with the second SLRB means that the first SLRB and the second SLRB are associated with same sidelink information, and some configuration parameters (parameters related to both sending and receiving) of the first SLRB and the second SLRB are the same. For example, the SLRB release request message is sent by using a PC5-RRC message.

Optionally, if the first terminal device has released the first SLRB and received a release failure response message sent by the target terminal device, the first terminal device restores the first SLRB to a corresponding first SLRB that exists before the release.

Alternatively, the first terminal device may first send the SLRB release request message to the target terminal device, and then release the first SLRB when or after receiving an SLRB release response message sent by the target terminal device.

Optionally, the first terminal device releases the first SLRB only when or after receiving an SLRB release success response message. For example, the SLRB release response message is sent by using a PC5-RRC message.

This application further provides an SLRB release method. The method includes:

If a target terminal device receives SLRB release information associated with first sidelink information, and has established an SLRB for the first sidelink information and a first logical channel, the target terminal device releases a second SLRB based on the SLRB release information associated with the first sidelink information. Optionally, the SLRB release information includes information about the first logical channel.

It should be understood that the SLRB in the method is an SL-DRB.

This application further provides an SLRB release method. The method includes:

When one or more of the following conditions are met, a first terminal device releases a first SLRB associated with first sidelink information:
  an SDAP entity corresponding to the first SLRB has been released;
  the first SLRB does not receive a data packet from an upper layer within preset duration;
  an access-layer reconfiguration failure message for the first sidelink information is received on a PC5-RRC interface;
  a radio link failure or another link problem occurs on a PC5 interface for a first sidelink indicated by the first sidelink information; and
  the upper layer indicates to release a PC5-S link corresponding to the first SLRB.

It should be understood that the first SLRB may be released when one or more of the foregoing conditions are met.

This application further provides an SLRB release method. The method includes: A target terminal device releases a second SLRB when one or more of the following is met:
  the target terminal device receives a second SLRB release indication;
  an SDAP entity corresponding to the second SLRB has been released;
  the second SLRB does not receive a data packet from an upper layer for a long time within third preset duration;
  the second SLRB does not receive a data packet from a PC5 interface for a long time within fourth preset duration;
  a PC5-RRC reconfiguration failure occurs on a first sidelink associated with the second SLRB;
  a radio link failure (RLF) or another link problem occurs on the first sidelink associated with the second SLRB; and
  a PC5-S link corresponding to the second SLRB is released.

It should be understood that the second SLRB may be released when one or more of the foregoing conditions are met.

This application further provides a communication method.

The method includes: When a terminal device establishes an SLRB for first sidelink information, the terminal device determines an association relationship between communication type information and an LCH corresponding to the SLRB for the first sidelink information. The communication type information includes one of unicast, multicast, and broadcast. An LCH ID and sidelink information uniquely identify an LCH.

It should be understood that the establishing, by a terminal device, an SLRB for first sidelink information may be understood as follows: The terminal device establishes an SLRB for a sidelink corresponding to the first sidelink information.

The method further includes: When the terminal device performs a MAC multiplexing or logical channel prioritization (LCP) process, the terminal device determines, based on a communication type attribute associated with a received scheduling resource grant and a communication type attribute associated with each LCH, an LCH that can be multiplexed to the grant. For example, the terminal device receives a grant associated with a unicast attribute, and the terminal device can multiplex, to the grant, only data corresponding to an LCH associated with a unicast attribute.

Optionally, there may be a plurality of communication type attributes associated with the grant received by the terminal device. For example, the grant is associated with both unicast and multicast. This means that both an LCH associated with unicast and an LCH associated with multicast can be multiplexed to the grant.

It should be understood that the target terminal device and the second terminal device in the foregoing descriptions are interchangeable.

In a current technology, in some scenarios, for example, when a terminal device detects that a beam failure occurs on an interface between the terminal device and a network device, the terminal device needs to contend for a resource in an exceptional pool with another terminal device to perform sidelink transmission. This may cause a case in which the terminal device cannot obtain a resource through contention, thereby affecting service continuity.

In view of this, this application further provides a communication method.

The method includes: When a terminal device detects that a beam failure occurs on an interface between the terminal device and a network device, or in a process in which a terminal device performs detection on a beam failure on an interface between the terminal device and a network device, or when a terminal device is synchronized to a global navigation satellite system (GNSS), if a configured grant has been configured for the terminal device, sidelink transmission is performed by using the configured grant.

For details about the configured grant, refer to a definition in an existing standard. Details are not described herein.

Optionally, if beamFailureDetectionTimer is running, the terminal device is in the process of performing detection on a beam failure on the interface between the terminal device and the network device.

According to the communication method provided in this application, when the beam failure occurs, or in the beam failure detection process, or when the terminal device is synchronized to the GNSS, the terminal device may preferentially use the configured grant that has been configured. Because the configured grant is dedicated to the terminal device, a collision caused by resource contention with another terminal device can be avoided, thereby ensuring service continuity of the terminal device, and meeting a QoS requirement.

Optionally, if no configured grant is configured for the terminal device, sidelink transmission is performed by using an exceptional pool.

Optionally, the configured grant includes a configured grant type 1 and a configured grant type 2. The configured grant type 1 can be directly used. The configured grant type 2 can be used after being activated by using downlink control information (DCI).

Optionally, after beam failure recovery is completed, the configured grant may still be used.

Optionally, after the beam failure recovery is completed, a MAC layer of the terminal device notifies an RRC layer that the exceptional pool is not in use.

Optionally, the performing sidelink transmission by using the configured grant includes: The RRC layer of the terminal device indicates a lower layer to perform sidelink transmission by using the configured grant.

For example, the lower layer may be the media access control (MAC) layer.

For example, the exceptional pool may be configured by using RRC or a SIB, or through pre-configuration.

Optionally, if a configured grant has been configured for the terminal device, the configured grant that has been configured is preferentially used for transmission on an SL; or if no configured grant is configured, an exceptional pool is used for transmission on the SL.

Optionally, the preferentially using the configured grant that has been configured may be understood as follows: When resources of the configured grant and the exceptional pool overlap, the terminal device or a logical channel that is on the terminal device and that is allowed to use the configured grant uses the configured grant that has been configured, but does not use the exceptional pool.

Optionally, the foregoing solution is also applicable to a radio link failure, a physical layer link problem, a cell handover scenario, and the like. This is not specifically limited in the present invention.

Optionally, when the beam failure occurs, the terminal device may select the GNSS as a synchronization source.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

FIG. 7 is a schematic structural diagram of an apparatus. The apparatus 1500 may be a network device; or may be a terminal device; or may be a chip, a chip system, a processor, or the like that supports a network device in implementing the foregoing methods; or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The apparatus 1500 may include one or more processors 1501. The processor 1501 may also be referred to as a processing unit, and may implement a specific control function. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to control a communications apparatus (for example, a base station, a baseband chip, a terminal, a terminal chip, a DU, or a CU), execute a software program, and process data of the software program.

In an optional design, the processor 1501 may alternatively store an instruction and/or data 1503, and the instruction and/or data 1503 may be run by the processor, so that the apparatus 1500 performs the methods described in the foregoing method embodiments.

In another optional design, the processor 1501 may include a transceiver unit configured to implement a sending function and a receiving function. For example, the transceiver unit may be a transceiver circuit, an interface, or an interface circuit. A transceiver circuit, an interface, or an interface circuit configured to implement the sending function and that configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1500 may include a circuit, and the circuit may implement the sending, receiving, or communication function in the foregoing method embodiments.

Optionally, the apparatus 1500 may include one or more memories 1502. The memory 1502 may store an instruction 1504, and the instruction may be run on the processor, so that the apparatus 1500 performs the methods described in the foregoing method embodiments. Optionally, the memory may further store data. Optionally, the processor may also store an instruction and/or data. The processor and the memory may be disposed separately, or may be integrated. For example, the correspondences described in the foregoing method embodiments may be stored in the memory or stored in the processor.

Optionally, the apparatus 1500 may further include a transceiver 1505 and/or an antenna 1506. The processor 1501 may be referred to as a processing unit, and control the apparatus 1500. The transceiver 1505 may be referred to as a transceiver unit, a transceiver device, a transceiver circuit, a transceiver, or the like, and is configured to implement sending and receiving functions.

The processor and the transceiver described in this application may be implemented in an integrated circuit (IC), an analog IC, a radio frequency integrated circuit RFIC, a mixed-signal IC, an application-specific integrated circuit (application specific integrated circuit, ASIC), a printed circuit board (PCB), an electronic device, or the like. The processor and the transceiver may also be fabricated by using various IC process technologies, for example, a complementary metal oxide semiconductor (complementary metal oxide semiconductor, CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 7. The apparatus may be an independent device, or may be a part of a larger device. For example, the apparatus may be as follows:

(1) an independent integrated circuit IC, a chip, or a chip system or subsystem;
(2) a set of one or more ICs, where optionally, the IC set may also include a storage component configured to store data and/or an instruction;
(3) an ASIC, for example, a modem (MSM);
(4) a module that can be embedded in another device;
(5) a receiver, a terminal, an intelligent terminal, a cellular phone, a wireless device, a handheld device, a mobile unit, an in-vehicle device, a network device, a cloud device, an artificial intelligence device, or the like; or
(6) others, or the like.

Figure 8:
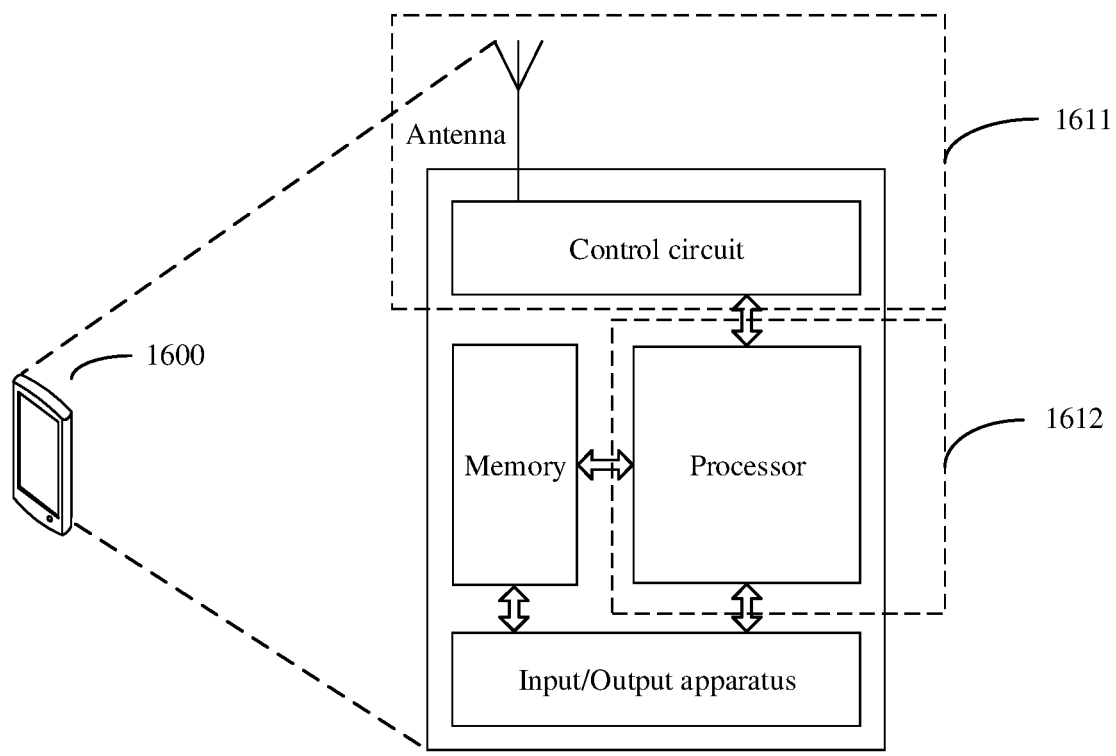
FIG. 8 is a schematic structural diagram of a terminal device according to an embodiment of this application.

FIG. 8 is a schematic structural diagram of a terminal device. The terminal device is applicable to the scenario shown in FIG. 1. For ease of description, FIG. 8 shows only main components of the terminal device. As shown in FIG. 8, the terminal device 1600 includes a processor, a memory, a control circuit, an antenna, and an input/output apparatus. The processor is mainly configured to process a communication protocol and communication data, control the entire terminal device, execute a software program, and process data of the software program. The memory is mainly configured to store the software program and data. The control circuit is mainly configured to perform conversion between a baseband signal and a radio frequency signal, and process a radio frequency signal. The antenna is mainly configured to send or receive a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in the storage unit, parse and execute an instruction of the software program, and process the data of the software program. When data needs to be sent wirelessly, the processor performs baseband processing on the to-be-sent data, and outputs a baseband signal to the control circuit. The control circuit processes the baseband signal to obtain a radio frequency signal, and sends the radio frequency signal in an electromagnetic wave form by using the antenna. When data is sent to the terminal device, the control circuit receives a radio frequency signal by using the antenna, further converts the radio frequency signal into a baseband signal, and outputs the baseband signal to the processor. The processor converts the baseband signal into data, and processes the data.

For ease of description, FIG. 8 shows only one memory and one processor. In an actual terminal device, there may be a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates the functions of the baseband processor and the central processing unit. A person skilled in the art can understand that the baseband processor and the central processing unit may be alternatively processors independent of each other, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, where the processor executes the software program to implement a baseband processing function.

In an example, the antenna and the control circuit that have a transceiver function may be treated as a transceiver unit 1611 of the terminal device 1600, and the processor that has a processing function may be treated as a processing unit 1612 of the terminal device 1600. As shown in FIG. 8, the terminal device 1600 includes the transceiver 1611 and the processing unit 1612. The transceiver unit may also be referred to as a transceiver, a transceiver device, a transceiver apparatus, or the like. Optionally, a device that is in the transceiver unit 1611 and that is configured to implement a receiving function may be treated as a receiving unit, and a device that is in the transceiver unit 1611 and that is configured to implement a sending function may be treated as a sending unit. In other words, the transceiver unit 1611 includes the receiving unit and the sending unit. For example, the receiving unit may also be referred to as a receiving device, a receiver, a receiving circuit, or the like; and the sending unit may be referred to as a transmitting device, a transmitter, a transmitting circuit, or the like. Optionally, the receiving unit and the sending unit may be one integrated unit, or may be a plurality of independent units. The receiving unit and the sending unit may be in one geographical location, or may be distributed in a plurality of geographical locations.

Figure 9:
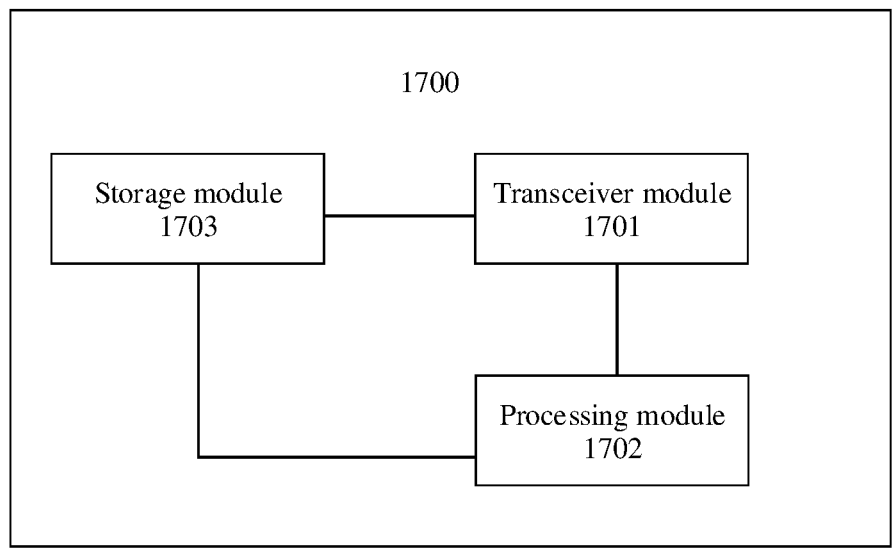
FIG. 9 is a schematic block diagram of another apparatus according to this an embodiment of application.

As shown in FIG. 9, another embodiment of this application provides an apparatus 1700. The apparatus may be a terminal device, or may be a component (for example, an integrated circuit or a chip) of a terminal device. Alternatively, the apparatus may be a network device, or may be a component (for example, an integrated circuit or a chip) of a network device. Alternatively, the apparatus may be another communications module configured to implement the methods in the method embodiments of this application. The apparatus 1700 may include a processing module 1702 (a processing unit). Optionally, the apparatus 1700 may further include a transceiver module 1701 (a transceiver unit) and a storage module 1703 (a storage unit).

In a possible design, one or more modules in FIG. 9 may be implemented by one or more processors, or implemented by one or more processors and memories, or implemented by one or more processors and transceivers, or implemented by one or more processors, memories, and transceivers. This is not limited in this embodiment of this application. The processor, the memory, and the transceiver may be disposed separately, or may be integrated.

The apparatus has a function of implementing the terminal device described in the embodiments of this application. For example, the apparatus includes a corresponding module, unit, or means used for the terminal device to perform the steps related to the terminal device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Alternatively, the apparatus has a function of implementing the network device described in the embodiments of this application. For example, the apparatus includes a corresponding module, unit, or means used for the network device to perform the steps related to the network device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

In a possible design, the modules in the apparatus 1700 may be configured to perform the operations performed by the terminal device in the method described in FIG. 2 in the embodiments of this application. For example, the processing module 1702 is configured to receive, by using an access layer, first information sent by an upper layer, where the first information is used to identify a first quality of service QoS flow. When the processing module 1702 determines, by using the access layer, that the first QoS flow is a new QoS flow for which sidelink communication needs to be performed, or when the processing module 1702 determines, by using the access layer, that the first QoS flow is a new QoS flow for which sidelink communication needs to be performed and no mapping relationship from the first QoS flow to a sidelink radio bearer SLRB is configured, or when the processing module 1702 determines, by using the access layer, that no mapping relationship from the first QoS flow to a sidelink radio bearer SLRB is configured, the transceiver module 1701 is configured to report first QoS information to a network device, where the first QoS information includes some or all content in the first information, and the first QoS information is used to request SLRB configuration information associated with the first QoS flow.

Optionally, the transceiver module 1701 is configured to receive the SLRB configuration information that is associated with the first QoS flow and that is sent by the network device.

Optionally, the first information includes first sidelink information, a first PC5 interface quality of service flow identifier PFI, and a first QoS parameter. The first sidelink information is associated with the first PFI and the first QoS parameter. The first sidelink information is used to identify a first sidelink. The first sidelink information includes one or more of first communication type information, a first source identifier, and a first destination identifier. The first communication type information is one of unicast, multicast, and broadcast.

Optionally, that the processing module 1702 determines, by using the access layer, that the first QoS flow is a new QoS flow for which sidelink communication needs to be performed includes:

If the processing module 1702 determines, by using the access layer, that a stored PFI associated with the first sidelink information does not include the first PFI, and/or a stored QoS parameter associated with the first sidelink information does not include the first QoS parameter, the processing module 1702 determines, by using the access layer, that the first QoS flow is the new QoS flow for which sidelink communication needs to be performed.

Optionally, the first QoS information includes the first QoS parameter and the first communication type information.

Optionally, the SLRB configuration information associated with the first QoS flow includes first service data adaptation protocol SDAP entity configuration information, the first SDAP entity configuration information includes the first QoS parameter, and the first SDAP entity configuration information is associated with the first communication type information.

Optionally, the first QoS information includes the first PFI, the first QoS parameter, and the first sidelink information.

Optionally, the SLRB configuration information associated with the first QoS flow includes first service data adaptation protocol SDAP entity configuration information.

When the first sidelink information includes the first communication type information, the first SDAP entity configuration information includes the first PFI, and includes content other than the first communication type information in the first sidelink information, and the first SDAP entity configuration information is associated with the first communication type information.

When the first sidelink information does not include the first communication type information, the first SDAP entity configuration information includes the first PFI and the first sidelink information.

In a possible design, the modules in the apparatus 1700 may be configured to perform the operations performed by the network device in the method described in FIG. 2 in the embodiments of this application. For example, the transceiver module 1701 is configured to receive first quality of service QoS information reported by a terminal device, where the first QoS information is used to request a mapping relationship from a first quality of service QoS flow to a sidelink radio bearer SLRB; and send, to the terminal device, SLRB configuration information associated with the first QoS flow.

Optionally, the first QoS flow is identified by first information, and the first QoS information includes some or all content in the first information. The first information includes first sidelink information, a first PC5 interface quality of service flow identifier PFI, and a first QoS parameter. The first sidelink information is associated with the first PFI and the first QoS parameter. The first sidelink information is used to identify a first sidelink. The first sidelink information includes one or more of first communication type information, a first source identifier, and a first destination identifier. The first communication type information is one of unicast, multicast, and broadcast.

In a possible design, the modules in the apparatus 1700 may be configured to perform the operations performed by the first terminal device in the method described in FIG. 5 in the embodiments of this application. For example, the processing module 1702 is configured to determine whether one or more of the following is met:

the first QoS flow has data;

the first terminal device is configured by an upper layer of the first terminal device to perform sidelink communication;

the first terminal device receives first configuration information sent by a network device, where the first configuration information indicates that the first QoS flow is mapped to a first SLRB, and the first SLRB has not been established;

the first terminal device receives a reconfiguration complete message sent by a second terminal device; and the first terminal device receives second configuration information sent by the second terminal device, where the second configuration information indicates that the first QoS flow is mapped to the first SLRB, and the first SLRB has not been established, where when the first SLRB is associated with a unicast connection, the second terminal device is a peer terminal device of the first terminal device in the unicast connection.

The processing module 1702 is further configured to: when one or more of the foregoing is met, the first terminal device establishes the first SLRB to which the first quality of service QoS flow needs to be mapped.

In a possible design, the modules in the apparatus 1700 may be configured to perform the operations performed by the first terminal device in the method described in FIG. 6 in the embodiments of this application. For example, the processing module 1702 is configured to determine whether one or more of the following is met: the first QoS flow has data; the first terminal device is configured by an upper layer to perform sidelink communication; the first terminal device receives first configuration information sent by a network device, where the first configuration information indicates that the first QoS flow is mapped to a first SLRB, and the first SLRB has been established; the first terminal device receives a corresponding PC5-RRC reconfiguration complete message; the first terminal device receives second configuration information sent by a second terminal device, where the second configuration information indicates that the first QoS flow is mapped to the first SLRB, and the first SLRB has been established. When the first SLRB is associated with a unicast connection, the second terminal device is a peer terminal device of the first terminal device in the unicast connection. The processing module 1702 is further configured to: when one or more of the foregoing is met, the first terminal device reconfigures the first SLRB.

In a possible design, the processing module 1702 is configured to determine whether one or more of the following is met.

When one or more of the following is met, the first terminal device releases the first SLRB:

the first terminal device is configured by an upper layer to perform sidelink communication;

the first terminal device receives first SLRB release information sent by a network device;

no QoS flow with data is mapped to the first SLRB;

the first terminal device receives a reconfiguration complete message sent by a second terminal device;

the first terminal device receives first SLRB release information sent by the second terminal device; and the first SLRB has no data to be sent or received, where when the first SLRB is associated with a unicast connection, the second terminal device is a peer terminal device of the first terminal device in the unicast connection.

The processing module 1702 is further configured to: when one or more of the foregoing is met, the first terminal device reconfigures the first SLRB.

In a possible design, the processing module 1702 is configured to: when it is detected that a beam failure occurs on an interface between the terminal device and a network device, or in a process of performing detection on a beam failure on an interface between the terminal device and a network device, or when it is determined that the apparatus 1700 is synchronized to a global navigation satellite system GNSS, if a configured grant has been configured for the apparatus 1700, control the transceiver module 1701 to perform sidelink transmission by using the configured grant.

Optionally, if no configured grant is configured for the apparatus 1700, the transceiver module 1701 is controlled to perform sidelink transmission by using a resource in an exceptional pool.

It should be understood that the apparatus 1700 may perform any method in the foregoing descriptions and a possible implementation of the method. Only some content corresponding to the method is described herein, and other content is not described in detail.

It should be understood that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (application specific integrated circuit, ASIC), a field programmable gate array (FPGA) or another programmable logic device, a discrete gate or transistor logic device, or a discrete hardware component.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (solid state disk, SSD)), or the like.

It should be understood that "an embodiment" mentioned in the whole specification particular features, structures, or characteristics related to the embodiment are included in at least one embodiment of this application. Therefore, the embodiments in the whole specification are not necessarily same embodiments. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further understood that, in this application, both "when" and "if" mean that UE or a base station performs corresponding processing in an objective case, but do not constitute a limitation on time, do not require that the UE or the base station perform a determining action during implementation, and do not mean that there is another limitation.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

In this specification, the term "at least one of" or "at least one type of" indicates all or any combination of listed items. For example, "at least one of A, B, and C" may indicate the following six cases: Only A exists, only B exists, only C exists, both A and B exist, both B and C exist, and all of A, B, and C exist.

In this specification, "at least one" indicates one or more, and "plurality" indicates at least two.

It should be understood that in the embodiments of this application, "B corresponding to A" indicates that B is associated with A, and B may be determined based on A. However, it should further be understood that B is determined based on A does not mean that B is determined based on A only, that is, B may also be determined based on A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and there may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a first terminal device or a chip of the first terminal device, the method comprising:
   obtaining an indication indicating that no Quality of Service (QoS) flow with data is mapped to a first sidelink radio bearer (SLRB); and
   releasing, based on the indication, the first SLRB, wherein the releasing the first SLRB comprises:
   releasing the first SLRB in response to receiving a second PC5-radio resource control (PC5-RRC) reconfiguration complete message from a second terminal device.

2. The method according to claim 1, wherein that no QoS flow with data is mapped to the first SLRB comprises:
   all QoS flows with data mapped to the first SLRB have been released.

3. The method according to claim 1, wherein the indication is configured by an upper layer of the first terminal device through an upper layer configuration, or a PC5-RRC reconfiguration message.

4. The method according to claim 3, wherein the upper layer is a vehicle to everything (V2X) layer of the first terminal device.

5. The method according to claim 1, wherein releasing the first SLRB comprises one or more of following:
   indicating release of the first SLRB to an associated service data adaptation protocol (SDAP) entity;
   releasing a radio link control (RLC) entity associated with the first SLRB;
   releasing a logical channel associated with the first SLRB; or
   releasing a SDAP entity in response to that all SLRBs associated with the SDAP entity are released.

6. A communication apparatus comprising:
   at least one processor, and a non-transitory memory storing instructions for execution by the at least one processor; wherein, when executed, the instructions cause the communication apparatus to perform operations comprising:
   obtaining an indication indicating that no Quality of Service (QOS) flow with data is mapped to a first sidelink radio bearer (SLRB); and
   releasing the first SLRB based on the indication, wherein the releasing the first SLRB comprises:
   releasing the first SLRB in response to receiving a second PC5-radio resource control (PC5-RRC) reconfiguration complete message from a second terminal device.

7. The communication apparatus according to claim 6, wherein that no QoS flow with data is mapped to the first SLRB comprises:
   all QoS flows with data mapped to the first SLRB have been released.

8. The communication apparatus according to claim 6, wherein the indication is configured by an upper layer of a first terminal device through an upper layer configuration, or by a PC5-RRC reconfiguration message.

9. The communication apparatus according to claim 8, wherein the upper layer is a vehicle to everything (V2X) layer of the communication apparatus.

10. The communication apparatus according to claim 6, wherein the releasing the first SLRB comprises one or more of following:
    indicating release of the first SLRB to an associated service data adaptation protocol (SDAP) entity;
    releasing a radio link control (RLC) entity associated with the first SLRB;
    releasing a logical channel associated with the first SLRB; or
    releasing a SDAP entity in response to that all SLRBs associated with the SDAP entity are released.

11. A non-transitory computer-readable storage medium, comprising instructions wherein which, when executed by at least one processor, the instructions cause a first terminal device to perform operations comprising:
    obtaining an indication indicating that no Quality of Service (QOS) flow with data is mapped to a first sidelink radio bearer (SLRB); and,
    releasing the first SLRB based on the indication, wherein the releasing the first SLRB comprises:
    releasing the first SLRB in response to receiving a second PC5-radio resource control (PC5-RRC) reconfiguration complete message from a second terminal device.

12. The non-transitory computer-readable storage medium according to claim 11, wherein that no QoS flow with data is mapped to the first SLRB, comprises:
    all QoS flows with data mapped to the first SLRB have been released.

13. The non-transitory computer-readable storage medium according to claim 11, wherein the indication is configured by an upper layer of the first terminal device through an upper layer configuration, or by a PC5-RRC reconfiguration message.

14. The non-transitory computer-readable storage medium according to claim 13, wherein the upper layer is a vehicle to everything (V2X) layer of the first terminal device.

* * * * *